(12) United States Patent
Roach et al.

(10) Patent No.: US 11,524,213 B1
(45) Date of Patent: Dec. 13, 2022

(54) SYSTEMS AND METHODS FOR ADDITIVE MANUFACTURING OF A GOLF CLUB HAVING AN INSERT STRUCTURE

(71) Applicant: Cobra Golf Incorporated, Carlsbad, CA (US)

(72) Inventors: Ryan L. Roach, Carlsbad, CA (US); Cameron J. Day, Vista, CA (US); Bryce W. Hobbs, Carlsbad, CA (US); D. Clayton Evans, San Marcos, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 10 days.

(21) Appl. No.: 16/933,129

(22) Filed: Jul. 20, 2020

Related U.S. Application Data

(60) Provisional application No. 62/877,373, filed on Jul. 23, 2019, provisional application No. 62/875,714, filed on Jul. 18, 2019.

(51) Int. Cl.
*A63B 53/04* (2015.01)
*B33Y 80/00* (2015.01)

(52) U.S. Cl.
CPC .............. *A63B 53/04* (2013.01); *B33Y 80/00* (2014.12); *A63B 53/047* (2013.01); *A63B 53/0412* (2020.08); *A63B 53/0416* (2020.08); *A63B 53/0466* (2013.01); *A63B 53/0487* (2013.01); *A63B 2209/00* (2013.01)

(58) Field of Classification Search
CPC ............ A63B 53/0454; A63B 53/0458; A63B 53/0462; A63B 53/0416
USPC ......................................................... 473/342
See application file for complete search history.

(56) References Cited

U.S. PATENT DOCUMENTS

| | | | | |
|---|---|---|---|---|
| 5,301,941 | A * | 4/1994 | Allen .................. | A63B 53/0466 473/327 |
| 6,183,381 | B1 * | 2/2001 | Grant .................... | C22C 47/068 473/342 |
| 6,319,150 | B1 * | 11/2001 | Werner .............. | A63B 53/0466 473/349 |
| 6,592,468 | B2 * | 7/2003 | Vincent ................ | A63B 53/047 473/345 |
| 7,500,923 | B2 * | 3/2009 | Tateno ............... | A63B 53/0487 473/329 |
| 10,668,338 | B2 * | 6/2020 | Morales ............. | A63B 53/0475 |
| 2002/0037776 | A1 * | 3/2002 | Krumme ........... | A63B 53/0466 473/329 |
| 2005/0009623 | A1 * | 1/2005 | Dickinson .............. | A63B 60/00 473/329 |

(Continued)

*Primary Examiner* — Raeann Gorden
(74) *Attorney, Agent, or Firm* — Quarles & Brady LLP

(57) ABSTRACT

A golf club head includes a body and an insert. The body defines a top side, a toe side, and a heel side, and includes a sole extending between the toe side and the heel side at a location on the body opposite to the top side. The body defines an internal volume defined between a ball-striking face and an internal wall. The insert is arranged within the internal volume and is formed layer by layer via an additive manufacturing process. The insert includes a lattice structure arranged between a rear surface of the ball-striking face and the internal wall. The lattice structure is in engagement with the rear surface and formed integrally with the ball-striking face and the internal wall.

29 Claims, 18 Drawing Sheets

(56) References Cited

U.S. PATENT DOCUMENTS

2016/0263449 A1* 9/2016 Morales ............... B23K 20/021
2020/0282272 A1* 9/2020 Spackman ............. A63B 60/00

* cited by examiner

SYSTEMS AND METHODS FOR ADDITIVE MANUFACTURING OF A GOLF CLUB HAVING AN INSERT STRUCTURE

CROSS REFERENCE TO RELATED APPLICATIONS

The present application is based on and claims priority to U.S. Provisional Patent Application No. 62/875,714, filed on Jul. 18, 2019 and U.S. Provisional Patent Application No. 62/877,373, filed on Jul. 23, 2019. The entire disclosures of which are incorporated herein by reference in their entirety.

REFERENCE REGARDING FEDERALLY SPONSORED RESEARCH OR DEVELOPMENT

Not applicable.

SEQUENCE LISTING

Not applicable.

BACKGROUND

1. Field of the Disclosure

The present disclosure relates to golf clubs, and more specifically to a golf club head that includes an insert or an insert-like structure that may be fabricated via 3-D printing or another additive manufacturing.

2. Description of the Background of the Disclosure

Different types of golf clubs (e.g., irons, drivers, fairway woods, utility irons, hybrid irons/woods, putters, etc.) are used to effect different types of shots, based on a golfer's location and ball lie when playing a hole on a golf course. A golfer's enjoyment of the game of golf is largely dependent on their success in making good shots, which requires hitting the ball the right distance in the intended direction under a variety of circumstances. Accurate shot-making is difficult even for experienced golfers due to the unforgiving nature of most golf clubs. Differences in a golfer's stroke or a ball's location of contact with the club face will result in varied shot outcomes.

Golf club manufacturers and designers provide various golf club head designs in an attempt to aid golfers in achieving more accurate shots, thereby improving a golfer's game and their overall enjoyment of the sport. Typically, conventional golf club heads are formed by a forging process, a casting process, a metal injection molding process, or a machined process (e.g., milling), and then machined, ground, and/or polished to a factory finish standard (e.g., dimensions, loft, lie, weight, offset, surface finish, aesthetics, etc.). However, conventional golf club head manufacturing processes are limited from geometric and structural perspectives by not being able to readily produce club heads with complex geometries and features.

Therefore, a need exists for golf club heads that include structures or features that provide performance benefits to improve overall shot accuracy, and that do not have the restrictions present in conventional golf club head manufacturing processes.

SUMMARY

In some embodiments, the present disclosure provides a golf club head that includes a body and an insert. The body defines a top side, a toe side, and a heel side, and includes a sole extending between the toe side and the heel side at a location on the body opposite to the top side. The body defines an internal volume defined between a ball-striking face and an internal wall. The insert is arranged within the internal volume and is formed layer by layer via an additive manufacturing process. The insert includes a lattice structure arranged between a rear surface of the ball-striking face and the internal wall. The lattice structure is in engagement with the rear surface and formed integrally with the ball-striking face and the internal wall.

In some embodiments, the present disclosure provides a golf club head that includes a body and an insert. The body defines a top side, a toe side, and a heel side and includes a sole extending between the toe side and the heel side at a location on the body opposite to the top side. The body defines an internal volume defined between a ball-striking face and an internal wall. The insert is arranged within the internal volume and is formed layer by layer via an additive manufacturing process. The insert includes a plurality of beams connected between a rear surface of the ball-striking face and the internal wall. The plurality of beams define a plurality of voids formed within the insert. The plurality of beams are formed integrally with the ball-striking face and the internal wall.

In some embodiments, the present disclosure provides a golf club head that includes a body and an insert. The body defines a top side, a toe side, and a heel side and includes a sole extending between the toe side and the heel side at a location on the body opposite to the top side. The body defines an internal volume defined between a ball-striking face and an internal wall. The insert is arranged within the internal volume and is formed layer by layer via an additive manufacturing process. The insert comprises an elastic beam that is configured to elastically support a rear surface of the ball-striking face. The insert is formed integrally with the internal wall.

DETAILED DESCRIPTION OF THE DRAWINGS

Figure 1:
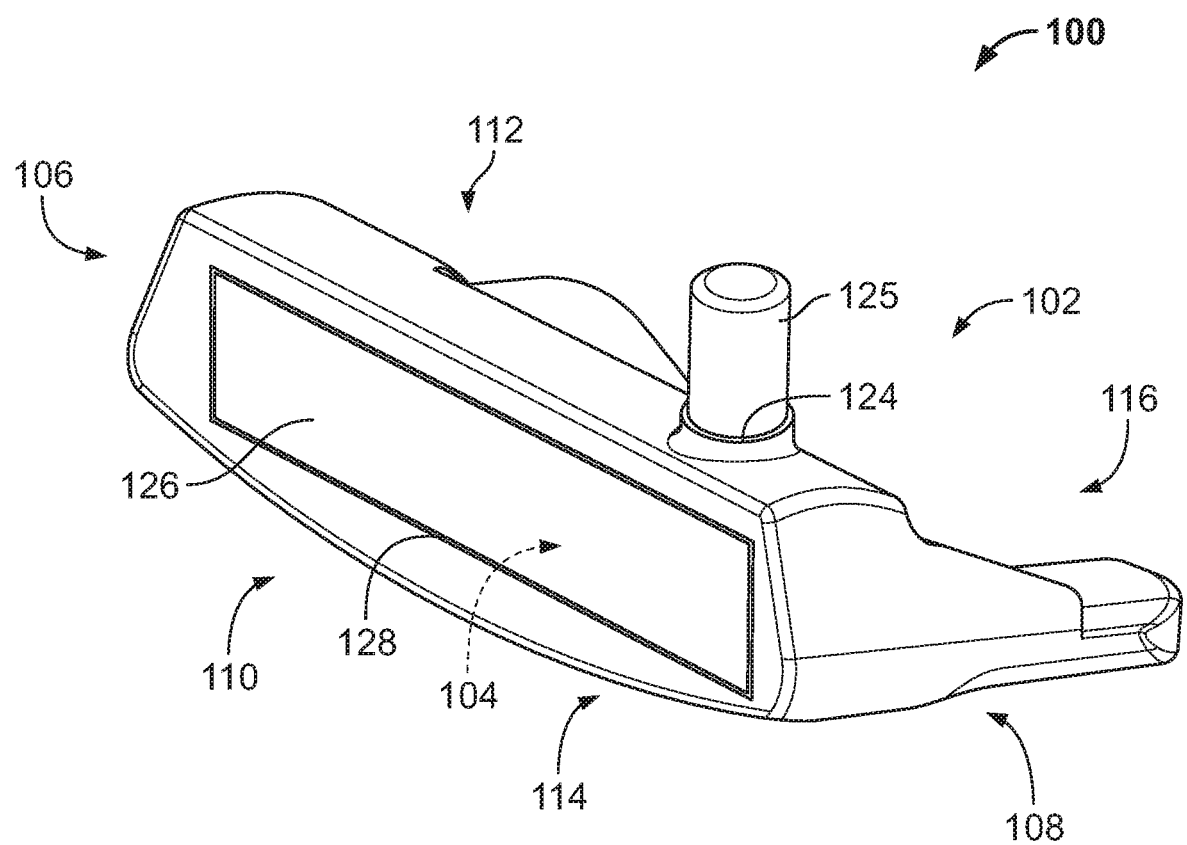
FIG. 1 is a top, front, left isometric view of a golf club head according to the present disclosure.

The use of the terms "segmented portion," "lattice portion," "lattice configuration," or "lattice structure," herein refer to portions of a golf club head that are formed by one of a plurality of interconnected segments, interconnected shapes, or connected surfaces or segments. In some embodiments, the plurality of interconnected segments, interconnected shapes, or connected surfaces or segments may be formed integrally with a club head body by an additive manufacturing process. In some embodiments, the lattice portion may define at least one cutout, or absence of material, that is formed within a unit cell (e.g., a repeated pattern defined by the lattice structure). The use of a lattice portion within a golf club head may allow various manufacturing and performance characteristics to be modified or customized. For example, a lattice portion may define a substantially reduced weight or density when compared to a solid material. As such, the placement of a lattice portion within a golf club head may be varied using an additive manufacturing process to selectively locate the CG of a golf club head in a desired location. In addition, the incorporation of a lattice portion into a golf club head may reduce the overall volume of material needed to manufacture the golf club head. Further, the properties and design of the lattice structure may be altered or tailored to provide one or more performance benefits to a golf club head.

The present disclosure provides golf club inserts and methods of manufacture that improve club performance, resulting in more accurate shots, and improving a golfer's game and their overall enjoyment of the sport. In general, an insert according to the present disclosure may be part of or arranged adjacent to a front face, or a ball-striking face, on a golf club head and may have geometries and configurations that improve distance control and accuracy in various ways. In some embodiments, an insert may be arranged within an internal cavity of a golf club head.

In some embodiments, a golf club insert may be manufactured via additive manufacturing (e.g., 3-D printing) technology, and the insert may include design and geometric aspects that are outside the realm of conventional machining and tooling techniques and processes. For example, the insert can include a lattice structure, voids, undercuts, and/or kerf-like structure designed to improve characteristics of the club head, specifically the ball-striking face. As a result of additive manufacturing technology, the insert can have a specific geometry in which material is strategically removed (via a lattice structure, voids, undercuts, and/or a kerf-like structure) to induce controlled movement and/or elastic deformation of the ball-striking face to effectively support the face upon impact with a golf ball, while still providing sound tuning and/or vibration damping to further improve sound and/or feel of the golf club head. The insert may distribute impact energy when ball-striking face hits a golf ball, so that club head maintains an overall cohesive form and good coefficient of restitution. This energy transfer can also be applied to counteract unwanted sidespin of the golf ball caused by off-center face strikes. In turn, the golf ball can travel farther and land closer to the pin, improving the golfer's chances of reducing the amount of strokes required on a given hole, ultimately improving their score and enjoyment of golf.

In some embodiments, an insert may include a lattice structure defining a variable coefficient of restitution (COR) across a ball-striking face on a golf club head. The variability may be provided by a variable thickness defined by support beams within the lattice structure. For example, the insert may include thicker support beams in adjacent to toe and heel regions of the insert, which defines a higher coefficient of restitution in the heel and toe regions of the ball-striking face relative to the center or medial region.

The customization of the COR along a ball-striking face in a golf club head may be beneficial to various golf club head types (e.g., wood-type club heads, iron-type club heads, hybrid-type club heads, putter-type club heads, etc.). For example, when putting, even when the golfer's stroke motion is the same, putts that skid after contact or are hit off-center from the putter face typically lose roll-out distance. The inserts described herein may correct for off-center hits and skidding, among other factors, by provided an increased COR in the heel and toe regions of the ball-striking face. For example, the insert may cause putts hit in the heel or toe regions to have closer to the same starting velocity as putts hit in the center of the face. The higher COR in the heel and toe regions may counteract the tendency of an off-center putt to have a shorter roll-out distance. In this way, the insert may provide putts with consistent distance, regardless of the impact location on the ball-striking face.

An insert according to the present disclosure may also be designed so that more force is required to produce a putt of a desired distance compared to a ball-striking face fabricated from a harder material such as metal. The advantage of this is that there is a larger force range that will produce a desired distance range. Therefore, a golfer may have a better chance of achieving the desired distance of the putt, even with a variable force input. The insert may further alleviate the need for precise force input to achieve desired distance result. That is, an insert of the present disclosure may allow a putter to be more forgiving, since the desired putt distance range corresponds to a larger force range.

Additionally, whether a golf club head feels soft or firm at impact may affect a golfer's satisfaction with their club. The feel of a golf club head is subjective, with some golfers liking a firm feel, and others liking a soft feel. The inserts of the present disclosure can be used to customize the feel of the club to the golfer's liking, offering performance improvements at differing levels of feel (i.e., firm, soft, or varying degrees therebetween). The lattice structure, insert, and the ball-striking face of a golf club head can be adjusted in both material and design to achieve softer or firmer feel. The material, hardness, and thickness of both the ball-striking face and the lattice beams, and the overall size or front-to-back thickness of the insert may each contribute to the feel and sound that the golfer realizes during impact. Different insert designs can be created to provide a range of different feel/sound results, according to individual golfer preference.

In some embodiments, an insert may include a lattice structure a kerf-like or a spring-like insert that is arranged adjacent to and/or that supports a portion of a ball-striking face on a golf club head. The kerf-like or spring-like insert may be manufactured via an additive manufacturing process, and may be formed integrally with the golf club head. For example, the kerf-like or spring-like insert may be sandwiched between the ball-striking face and an internal surface or wall of the golf club head. In some embodiments, the ball-striking face, the internal surface or wall, and the kerf-like or spring-like structure may be formed integrally (e.g., at the same time during the same additive manufacturing process), which enables the kerf-like or spring-like structure to be secured to golf club head without the need for fasteners, adhesives, etc.

Due to the nature of the golf club inserts described herein, the disclosed geometries and structures can be designed and manufactured using additive manufacturing technology. Additive manufacturing allows a designer to construct a specific geometry that is outside the realm of a tooled part and thus allows for even greater improvement in the performance of the club head than what is currently possible. Because of the nearly limitless geometry constraints, designs can be utilized in which material is strategically absent in the insert. For example, the ball-striking face of the golf club head can be manufactured to include detailed and complex design features such as a lattice structure, cantilevers, undercuts, and/or kerf-like structure. These design features provide enough support to the ball-striking face for durability standards while aiding in applying topspin and affecting launch angle or ball speed. The additively manufacturing inserts described herein offer improved distance control through variable coefficient of restitution, increased topspin on impact, and wider force range to corresponding distance range, while also allowing for adjustable feel.

Another advantage of additively manufacturing the insert is that no expensive tooling needs to be created to make the part. Inserts can be made on demand, and the underlying design can be adjusted on an individual basis to suit the needs of a particular golfer. A golfer can be led through a fitting process to determine the appropriate insert material, design, ball-striking face thickness, and overall feel. Then a unique insert specifically for that golfer can be printed on demand. Yet another advantage to manufacture the lattice structure and insert in this way is it removes the need for welding, adhesives, or other mechanical fasteners that add weight and also adds steps in the manufacturing process, saving time and money.

The golf club heads disclosed herein may be manufactured using one or more of a variety of additive manufacturing processes. For example, a golf club head according to the present disclosure may be at least partially fabricated using a metal powder bed fusion additive manufacturing processes that fuses, melts, or bonds metal powder particles layer by layer along a build plane. In some embodiments, the metal powder particles may be melted or fused by a laser that forms cross-sections of a golf club head layer by layer along a build plane. In some embodiments, the metal powder particles may be melted or fused by an electron beam or ultrasonic energy to form cross-sections of a golf club head layer by layer along a build plane. In some embodiments, the metal powder particles may be bonded to form cross-sections of a golf club head layer by layer along a build plane via the deposit (e.g., printing) of a binder.

The various methods of additive manufacturing used to manufacture a golf club heads according to the present disclosure may include binder jetting, direct energy deposition, selective laser melting (SLM), direct metal laser sintering (DMLS), fused deposition modeling (FDM), electron beam melting, laser powered bed fusion (LPBF), ultrasonic additive manufacturing, material extrusion, material jetting, Joule printing, electrochemical deposition, cold spray metal printing, DLP metal printing, Ultrasonic Consolidation or Ultrasonic Additive Manufacturing (UAM), LENS laser-based printing, electron beam freeform fabrication (EBF3), laser metal deposition, or carbon fiber additive manufacturing.

Referring now to FIGS. 1-4, a golf club head 100 is shown in accordance with the present disclosure. In the illustrated embodiment, the golf club head 100 is in the form of a putter-type golf club head. It should be noted that, while the following description relates to putter-type golf club heads, embodiments of the additively manufactured inserts described herein can be included in other golf club heads, including, but not limited to, wood-type and hollow-body golf club heads (e.g., drivers, fairways, etc.), hybrid golf club heads, and irons. In some embodiments, parts of the golf club head 100 are preferably cast or forged from suitable material such as stainless steel, carbon steel or titanium. In some embodiments, the golf club head 100 may be fabricated, layer by layer, from an additive manufacturing process.

The golf club head 100 includes a body 102 and an insert 104, which may be coupled to the body 102 or formed (e.g., via additive manufacturing) with the body 102. The use of the term "insert" herein is not limited to a part or component that is fabricated separately and then inserted into another body or structure. In some instances according to the present disclosure, an "insert" may be integrally fabricated with a body or another structure of a golf club head.

The body 102 defines a toe side 106, a heel side 108, a front side 110, a top side or crown 112, a bottom side or sole 114, and a rear side 116. Referring to FIG. 1, the body 102 and the insert 104 of the golf club head 100 may be formed from metallic and/or non-metallic materials. For example, the body 102 and/or the insert 104 may be formed from any one of or a combination of aluminum, bronze, brass, copper, stainless steel, carbon steel, titanium, zinc, polymeric materials, and/or any other suitable material. In some embodiments, the insert 104 may be fabricated from the same material as the body 102. In some embodiments, the insert 104 may be fabricated from a different material than the body 102.

Figure 2:
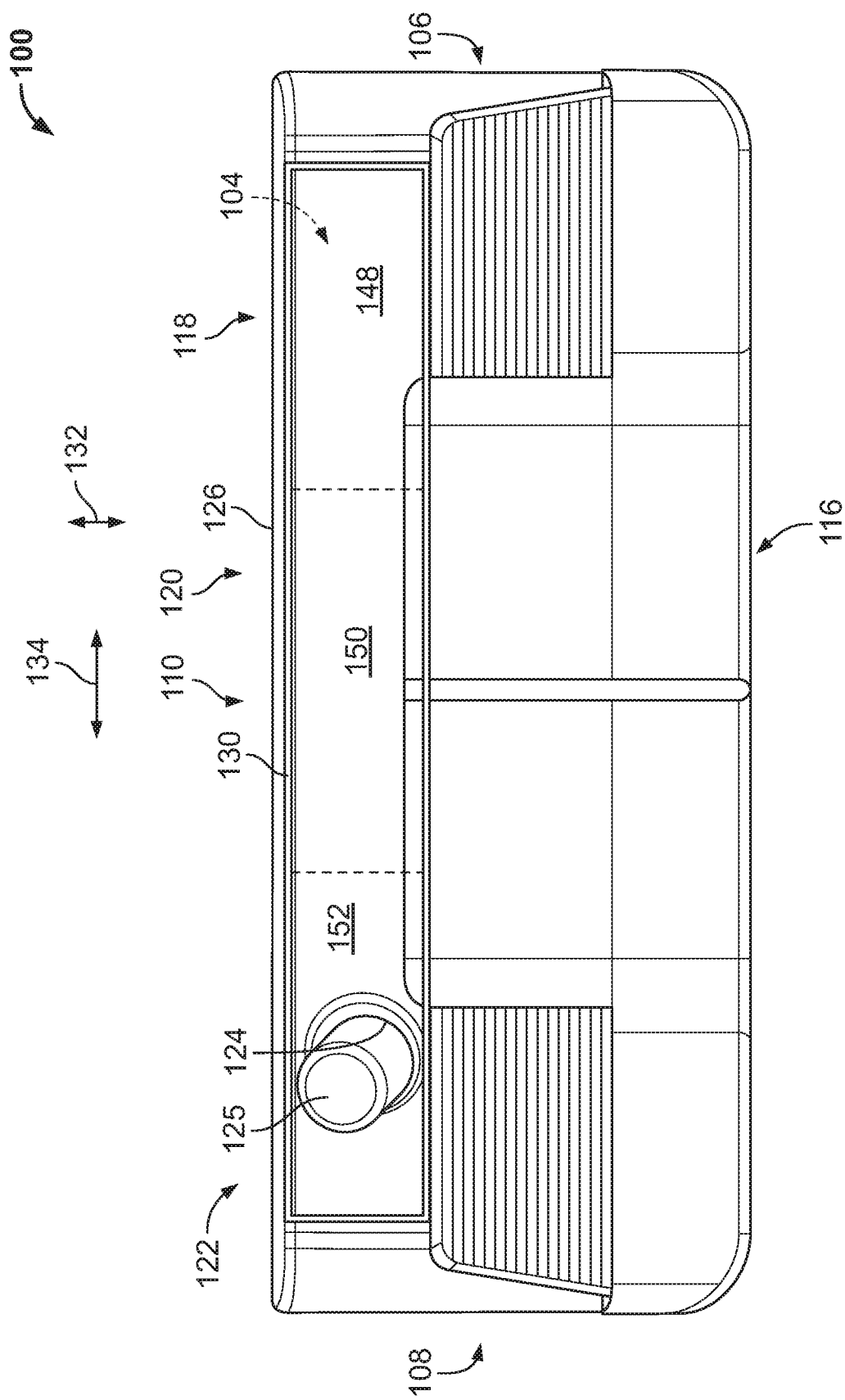
FIG. 2 is a top plan view of the golf club head of FIG. 1.

Referring to FIGS. 1 and 2, the body 102 defines a toe portion or region 118, a medial portion or region 120, and a heel portion or region 122. The heel region 122 of the body 102 includes an aperture 124 that is recessed into the top side 112, which is configured to receive and secure a shaft 125. In some embodiments, the heel region 122 may include a hosel (not shown) that extends upwardly from the top side 112 (e.g., from the perspective of FIG. 1, when the golf club head is at address).

The front side 110 of the body 102 includes a ball-striking face 126, which may be a separately constructed with the insert 104 and secured to the body 102 or may be integrally constructed and formed with the body 102 (e.g., via additive manufacturing). In some embodiments, the insert 104 may be positioned relative to, and in contact with, a rear surface (not shown) of the ball-striking face 126. In some embodiments, the insert 104 may be formed integral with the ball-striking face 126 via an additive manufacturing process.

An outline 128 on the front side 110 of the body 102 may define the ball-striking face 126, indicating the size, shape, and position of the insert 104 (see FIG. 1). It should be understood that inserts can be larger or smaller, and can have different shapes, up to and including the bounds of the ball-striking face 126 itself. An outline 130 on the top side 112 of the body 102 may further define the size, shape, and position of the insert 104 (see FIG. 2). That is, the combination of the outline 128 and the outline 130 may define the volume occupied by the insert 104 within the body 102. In some embodiments, the volume occupied by the insert 104 may vary from that shown in FIGS. 1 and 2. For example, a thickness or depth defined by the insert 104 (e.g., a dimension in a front-back direction 132 defined by the insert 104) may vary depending on the design and desired performance characteristics of the insert 104. Alternatively or additionally, a width defined by the insert 104 (e.g., a dimension in a heel-toe direction 134) may vary. In some embodiments, the insert 104 may extend in the heel-toe direction 134 over an entire length of the body 102. In some embodiments, the insert 104 may extend in the heel-toe direction 134 over an entire length of the ball-striking face 126. In some embodiments, the insert 104 may extend in the heel-toe direction 134 over a portion of the ball-striking face 126.

Figure 4:
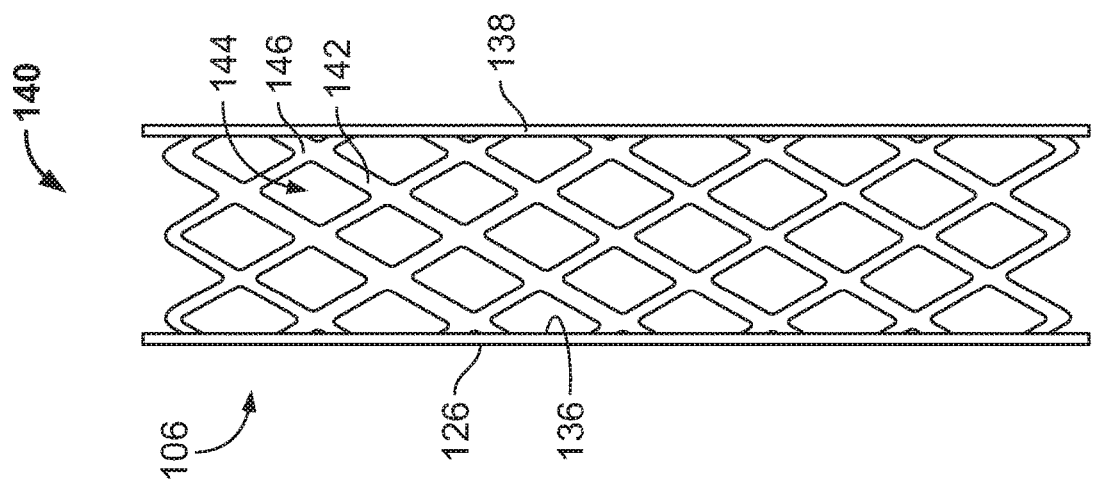
FIG. 4 is a is a top plan view of the insert of FIG. 3.
Figure 3:
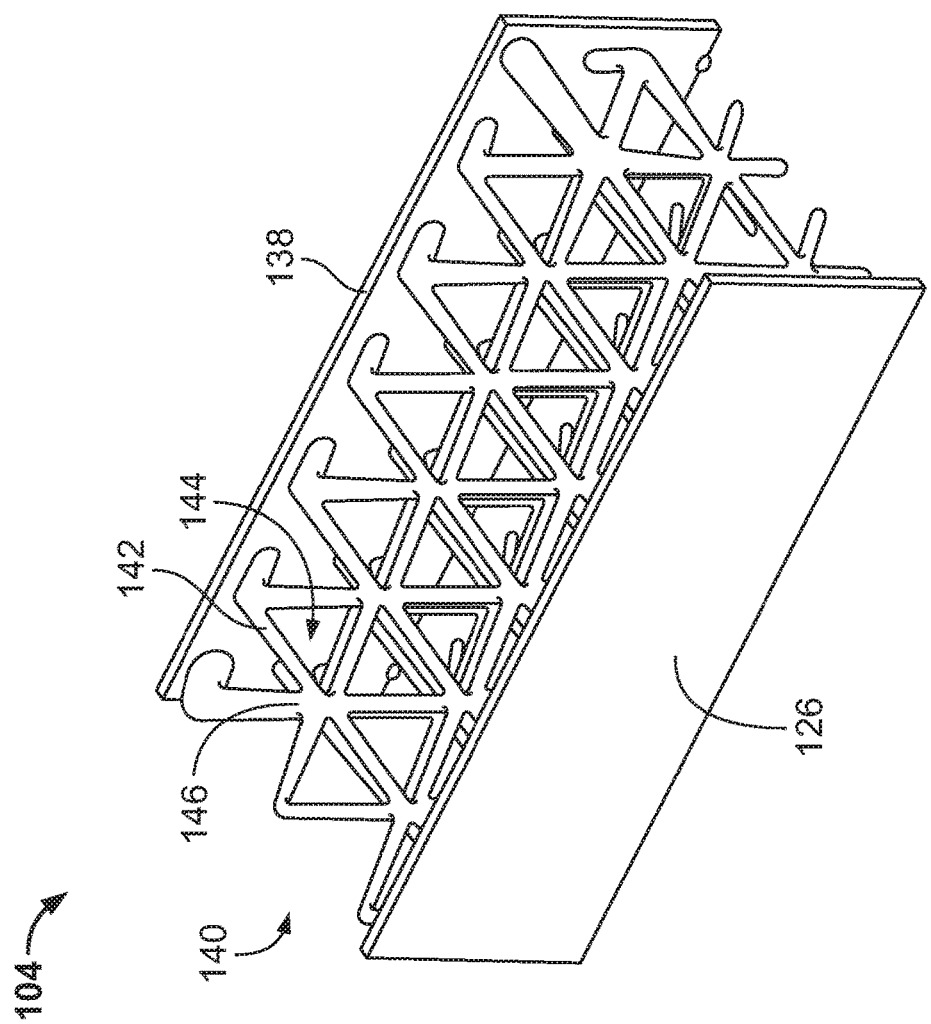
FIG. 3 is a top, front, left isometric view of an insert of the golf club head of FIG. 1.
Figure 5:
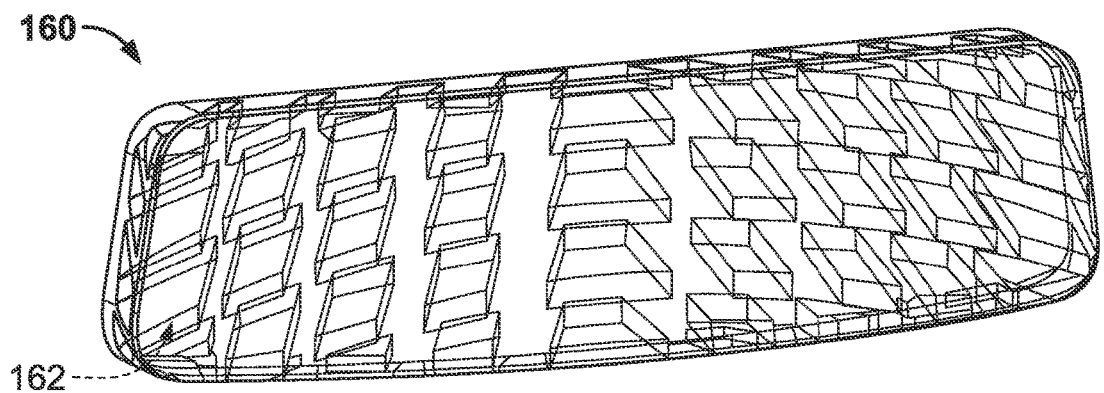
FIG. 5 is a top, front, right transparent isometric view of another insert that may be integrated into the golf club head of FIG. 1.
Figure 6:
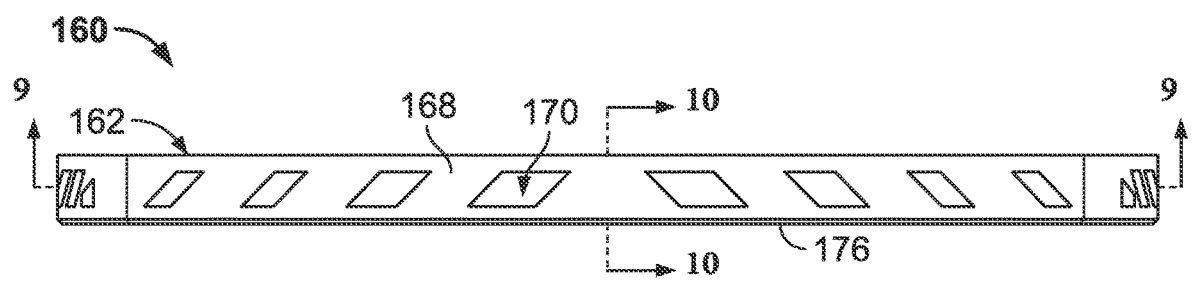
FIG. 6 is a top plan view of the insert of FIG. 5.
Figure 7:
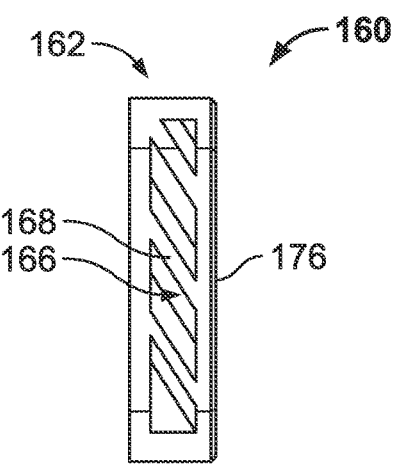
FIG. 7 is a left side view of the insert of FIG. 5.
Figure 8:
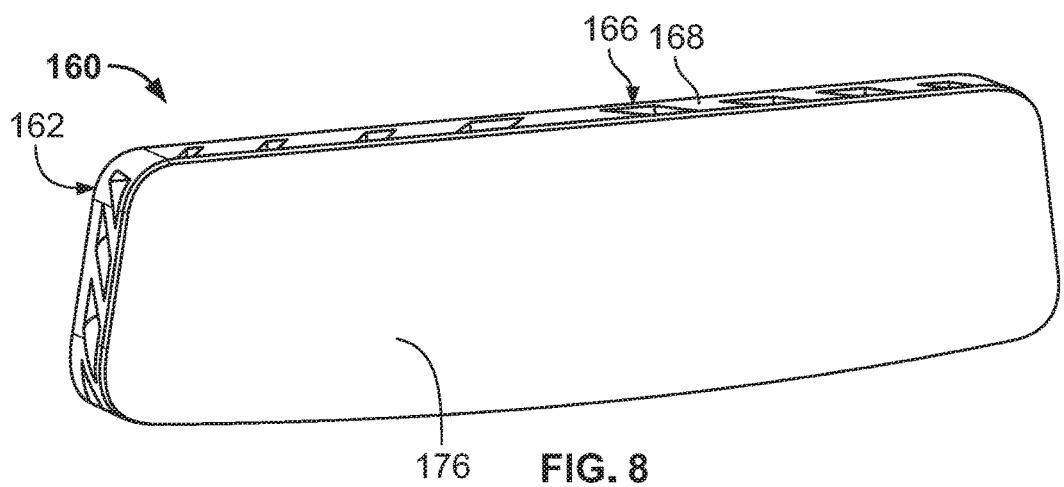
FIG. 8 is a top, front, right isometric view of the insert of FIG. 5.
Figure 9:
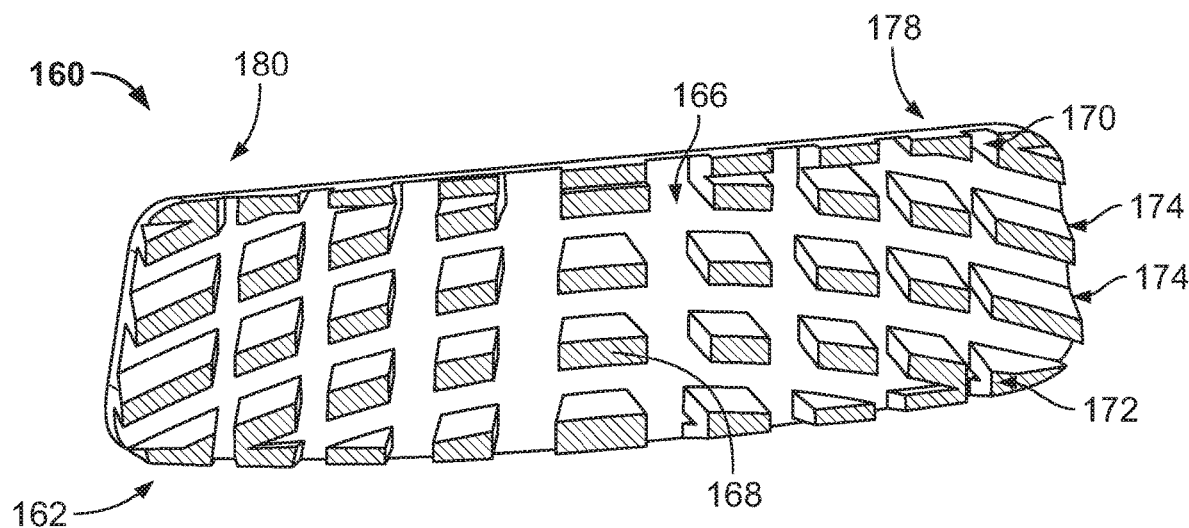
FIG. 9 is a cross-sectional view of the insert of FIG. 6 taken along line 9-9.
Figure 10:
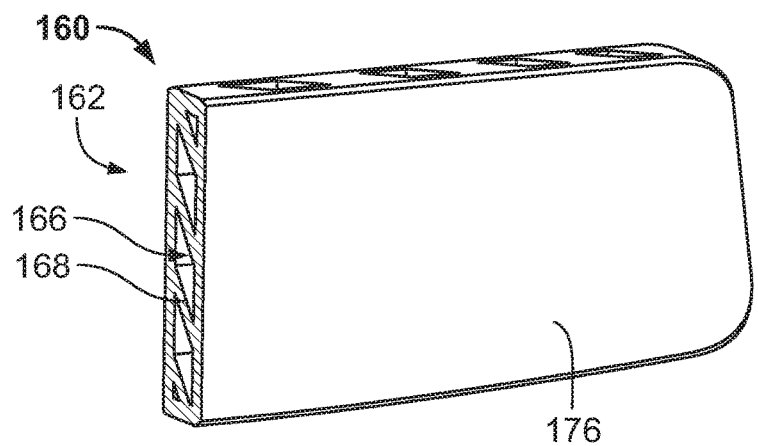
FIG. 10 is a cross-sectional view of the insert of FIG. 6 taken along line 10-10.
Figure 11:
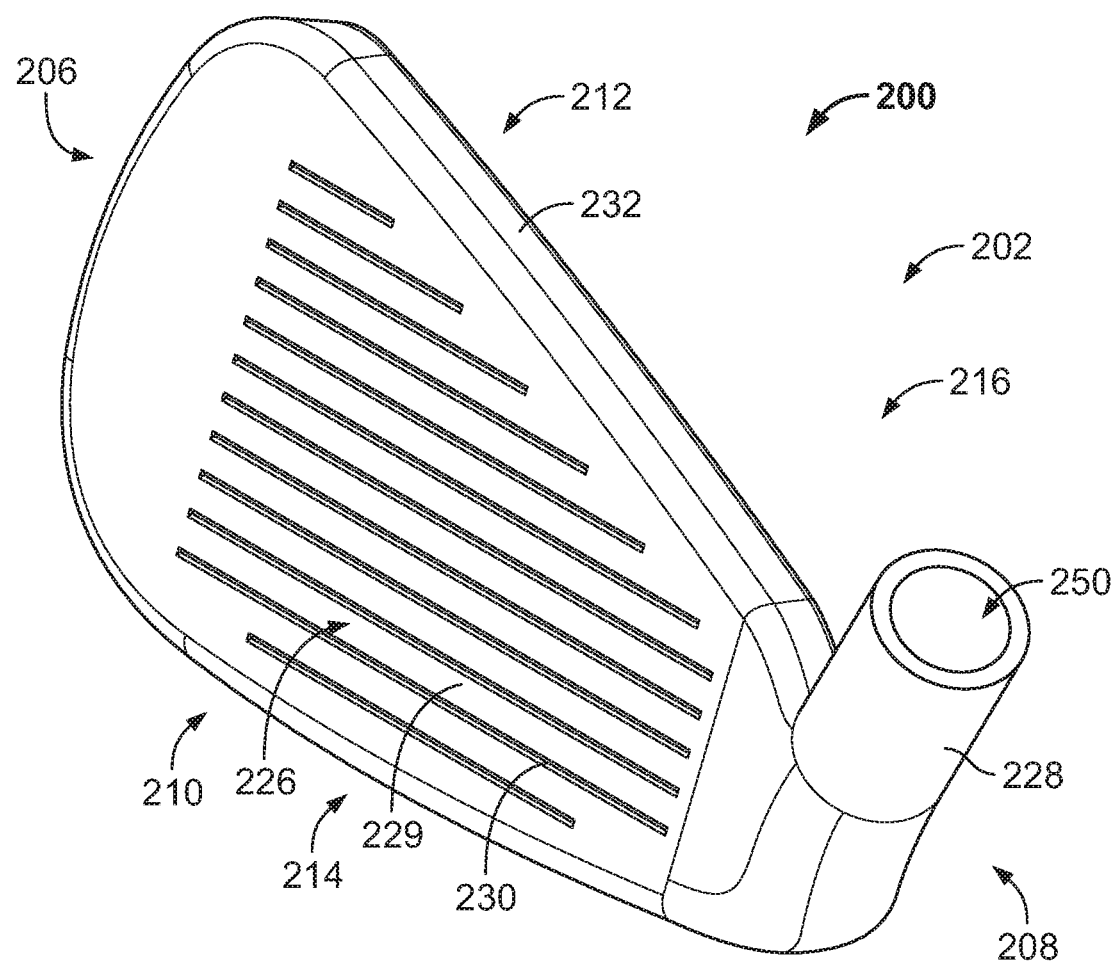
FIG. 11 is a top, front, left isometric view of a golf club head according to the present disclosure.

The insert 104 may be positioned within a cavity or an interior volume of the body 102. The interior volume occupied by the insert 104 may be defined by the intersection of the planes defined by the outlines 128 and 130. In some embodiments, the insert 104 may be secured within the body 102 via an adhesive, for example, or other means of securing the insert 104. Referring to FIGS. 3 and 4, for example, the interior volume may be defined by a rear surface 136 of the ball-striking face 126, an internal surface or wall 138 of the body 102 that opposes the rear surface 136, and opposing sidewalls (not shown) within the interior volume of the body 102.

As a result of additive manufacturing technology, the insert 104 can define specific geometry and properties that counteract distance-loss on off-center hits, increase topspin and reduces skidding, increase the range of force input needed for a desired putt distance range, and provides other performance advantages. In general, the insert 104 may be manufactured, layer by layer, via an additive manufacturing process. In some embodiments, the complex geometry of the insert 104 can be provided by fashioning the insert 104 using an additive manufacturing technology, such as 3-D printing of a material, generally a non-metal material, such as carbon and plastics, including, for example, thermoplastic polyurethane (TPU). In some embodiments, the insert 104 may be fabricated from a material selected from the group consisting of nylon, glass fiber reinforced nylon, polyurethane, silicon, rubber, bulk molding compound, thermoplastics (e.g., TPU), thermosets, resins, and combinations thereof. In some embodiments, the insert 104 may be fabricated from a combination of a non-metal material and a metal material, such as stainless steel, aluminum, titanium, or metal blends, as well as non-metal materials. In some embodiments, the insert 104 may be fabricated from a metal material or alloy.

Referring to FIGS. 3 and 4, the insert 104 may include a lattice structure 140 arranged within the body 102. In the illustrated embodiment, the lattice structure 140 is arranged between the rear surface 136 of the ball-striking surface 126 and the internal wall 138. The lattice structure 140 may include a plurality of interconnected beams or segments 142. In some embodiments, the lattice structure 140 may comprise any useful lattice system, such as triclinic, monoclinic, orthorhombic, tetragonal, hexagonal, or cubic configurations. The lattice structure 140 may define a plurality of unit cells 144 that are formed by a cutout, air space, or absence of material defined between interconnected intersection points or nodes 146 that occur along a common plane. For example, in the illustrated embodiment, the lattice structure 140 may define diamond-shaped unit cells 144. In some embodiments, the lattice structure 140 may define triangular-, rectangular-, or square-shaped unit cells 144. Alternatively or additionally, in some embodiments, at least a portion of the unit cells 144 in the lattice structure 140 according to the present disclosure may define a pentagonal shape, a hexagonal shape, or any other polygonal shape.

In some embodiments, the unit cell shape defined by the lattice structure 140 can be formed by interconnected shapes (e.g., ovals, circles, or another geometric shape) with varying orientation to form a repeated pattern, or unit cell. In some embodiments, the lattice structure 140 according to the present disclosure may be formed by a differential geometry structure. For example, the lattice structure 140 may be formed by a gyroid structure that includes a plurality of interconnected, periodic minimal surfaces. The gyroid structure may define a unit cell that is repeated in a pattern over a desired volume to form a lattice structure according to the present disclosure. In general, the use of a differential geometry structure (e.g., a gyroid) may reduce stress concentrations formed along the lattice structure due to the reduction in sharp edges formed on the lattice structure. In some embodiments, a lattice structure according to the present disclosure may define a tublane structure or a plate-lattice structure.

In some embodiments, the lattice structure 140 a hybrid or variable structure that varies in one or more of unit cell type, unit cell geometry, unit cell size, segment/beam length, segment/beam thickness, segment/beam volume, and unit cell density at one or more locations along the lattice structure 140. In general, different lattice geometries provide different levels of rigidity and flexibility. For example, the lattice beams 142 may define a variable thickness over the lattice structure 140. Generally, a thicker lattice beam may provide more rigidity than a lattice beam that is thinner. This variability in the lattice structure 140 may define a variable COR over selective portions of the insert 104. In some embodiments, the insert 104 may include thicker lattice beams 142 adjacent to the toe region 118 and the heel region 122 of the body 102, which provides a higher COR in these regions relative to the medial region 120, which may include thinner lattice beams 142. In some embodiments, the properties of the lattice structure 140 may be designed to provide more face flex, which may correlate with higher COR for metal materials, in the toe region 118 and the heel regions 122. Depending on the material that the insert 104 and/or the ball-striking face 126 is fabricated from, the lattice beams 142 may define a range of thicknesses along the ball-striking face 126 in varying locations.

In some embodiments, the insert 104 may include an insert toe region 148, an insert center or medial region 150, and an insert heel region 152 (see FIG. 2). In some embodiments, for example, the insert toe region 148, the insert center region 150, and the insert heel region 152 may define different or varying elasticity or COR. The lattice structure 140 can be designed with distinct sections of the insert 104, and thereby the ball-striking face 126, having different COR, or the lattice structure 140 can have a COR gradient, which increases from a center of the insert 104 or the ball-striking face 126 laterally outward to the insert toe region 148 and the insert heel region 152, to provide a more gradual transition from lower- to higher-elasticity or COR.

For example, in some embodiments, the insert toe region 148 and the insert heel region 152 may include lattice beams 142 with thicker geometry when compared to the lattice beams 142 of the insert center region 150, which defines a higher COR in the insert toe region 148 and the insert heel region 152 than the insert center region 150. In these embodiments, the insert 104 may define a step-change increase in COR on the ball-striking face 126 at the intersections between the insert center region 150 and both of the insert toe region 148 and the insert heel region 152. In some embodiments, the insert 104 may define a gradient in the thickness of the lattice beams 142, which provides a gradient in elasticity or COR along the ball-striking face 126. For example, in some embodiments, the COR or elasticity may define a linear increase from the intersection between the insert center region 150 and both of the insert toe region 148 and the insert heel region 152 to the lateral ends of the insert toe region 148 and the insert heel region 152. In some embodiments, the COR or elasticity may define a non-linear increase (e.g., parabolic or exponential) from the intersection between the insert center region 150 and both of the insert toe region 148 and the insert heel region 152 to the lateral ends of the insert toe region 148 and the insert heel region 152. In some embodiments, the COR or elasticity may define an increase (e.g., linear or non-linear) from a center plane defined by the insert center region 150 to the lateral ends of the insert toe region 148 and the insert heel region 152. In some embodiments, the insert center region 150 may comprise between approximately 40% and approximately 60% of a lateral length (e.g., a length of the body 102 in the heel-toe direction 134) with the remaining lateral length being divided evenly among the insert toe region 148 and the insert heel region 152.

The variability in the elasticity or COR along the insert 104 and the ball-striking face 126 may enable putts hit on the toe region 118 or the heel region 122 of the ball-striking face 126 have a starting velocity that is approximately or equal to a starting velocity of putts hit in the center of the ball-striking face 126. In this way, for example, the higher COR defined as the insert 104 extends laterally toward the insert toe region 148 and the insert heel region 152 counteracts the tendency of an off-center putt to have a shorter roll-out distance. The insert 104 therefore provides putts with a consistent distance, regardless of the impact location on the ball-striking face.

In some embodiments, other features of the lattice structure 140 may be varied along the insert 104 to defined a desired COR profile along the ball-striking face 126. For example, one or more of unit cell type, unit cell geometry, unit cell size, segment/beam length, segment/beam thickness, segment/beam volume, and unit cell density at one or more locations along the lattice structure 140.

In addition to geometries and configurations that counteract distance-loss on off-center hits, the insert 104 may also include design features that increase topspin and prevent skidding upon ball contact with the grass after a putt is struck. Putts that begin rolling sooner after contact with the putter have more consistent roll-out distances than putts that skid on the surface of the green before beginning their roll. Skidding occurs when the ball has translational movement without corresponding rotational movement. When a ball is struck without sufficient topspin, it may begin its translational movement by skidding before eventually settling into a roll.

Design features including cantilevers, undercuts, kerf structures, and/or living hinges on the insert and/or face can alleviate this problem by applying more topspin on contact. A kerf is a slit, cut, notch, or void in a material or surface, generally made by cutting or removing material with a saw or similar tool. A relief is a structural form that is distinguished from a surrounding plane surface. Therefore a kerf-like relief is a structural form that resembles a slit, cut, or notch in a surface. 3D printed structures of the invention can be "kerf-like" in the sense that they resemble the structure of a kerf but were made by an additive manufacturing technique rather than being made by removing material with a saw or other cutting tool. A living hinge is a hinge that connects two rigid parts made from the same material as the hinge. The living hinge is thinner than the two rigid parts, allowing the structure to flex along the line of the hinge. These and other design features can be used in combination with cantilevers or other rigid structural elements to give the inserts desired mechanical characteristics. These design features may help to reduce the amount of backspin generated during golf ball impacts, enabling the ball to begin its roll sooner after impact, thus reducing skidding. For example, a cantilever that is configured to deflect may be effective in imparting top spin to the ball upon impact. In some embodiments, a cantilever may be unsupported adjacent to a ground-side or sole-side of the ball-striking surface 126. The cantilever may be configured to flex and produce less backspin during an impact. In some embodiments, the cantilever may be attached to a living hinge. In some embodiments, a cantilever may be integrated into portions of the lattice structure 140 that are only connected on one side. In some embodiments, the lattice structure 140 may include a plate or wall and the cantilever may be arranged on a side of the plate or wall that is opposite to the lattice structure 140.

The elasticity defined by the lattice structure 140 of the insert 104 also provides improved putting performance because more force is required to produce a putt of a desired distance than if the ball-striking face 126 and the body 102 behind the ball-striking face 126 fabricated a harder material such as solid metal. In this way, the golf club head 100 is more forgiving of slight differences in force input, allowing improved putting performance.

FIGS. 5-10 illustrates an insert 160 that may be coupled to or formed/manufactured integrally with the golf club head 100. The insert 160 may be fabricated, layer by layer, via an additive manufacturing process. The insert 160 may include a lattice structure 162 that includes a plurality of contours 164 extending laterally across the insert 160. The contours 164 define a plurality of voids 166 and lattice beams 168. Each of the plurality of voids 166 may be defined between adjacent pairs of the lattice beams 168. In the illustrated embodiment, the contours 164 may include a top-side contour 170, a bottom-side contour 172, and a plurality of middle contours 174 arranged between the top-side contour 170 and the bottom-side contour 172. In the illustrated embodiment, the middle contours 174 may be spaced vertically (e.g., from the perspective of FIG. 9) and may define a generally arcuate or curved profile as they extend laterally across the insert 160 (see FIG. 9).

The beams 168 and corresponding voids 166 formed between the beams 168 may define a generally angled shape. For example, the beams 168 may be angled with respect to a plane normal to a ball-striking face 176 of the insert 160. In other words, the beams 168 may not extend perpendicularly relative to the ball-striking face 176 (see FIGS. 6 and 7). In addition to the angled arrangement of the beams 168 with respect to the ball-striking face 176, the beams 168 forming the middle contours 174 may generally conform to the arcuate or curved shape thereof (see FIG. 9).

The voids 166 and the beams 168 formed across the insert 160 may provide different elastic or COR properties along different portions of the insert 160, and thereby the ball-striking face 176. For example, in the illustrated embodiment, the beams 168 may gradually increase in lateral thickness or width as they extend further toward the lateral edges of the insert 160 (see FIG. 9), which corresponds with decreasing void 166 sizes between adjacent beams 168 in a corresponding contour (see FIGS. 6 and 9). This increase in the beam 168 thickness or width, and corresponding decrease in the void 166 size, may increase the elasticity or COR in an insert heel region 178 and an insert toe region 180 of the insert 160 when compared to an insert center region 182 of the insert 160. As described herein, this varied COR along the insert 160 may counteract the tendency of an off-center putt to have a shorter roll-out distance, and may provide putts with a consistent distance, regardless of the impact location on the ball-striking face 126.

As described herein, the properties and characteristics of the inserts described herein may be applied to golf club heads other than putter-type golf club heads. For example, FIGS. 11-17 illustrate an iron-type golf club head 200 that may include a body 202 and an insert 204 configured to be arranged within the body 202. It should be noted that, while the following description relates to iron-type golf club heads, embodiments of the additively manufactured inserts described herein can be included in other golf club heads, including, but not limited to, wood-type and hollow-body golf club heads (e.g., drivers, fairways, etc.), hybrid golf club heads, and putters. In some embodiments, the golf club head 200 may be fabricated, layer by layer, via an additive manufacturing process. In some embodiments, the insert 204 may be fabricated, layer by layer, via an additive manufacturing process. In some embodiments, the insert 204 may be coupled to the body 202, for example, via an adhesive. In some embodiments, the insert 204 may be formed integrally with the body 202, layer by layer, via an additive manufacturing process, such that the insert 204 and body 202 are formed as a unitary component, which doesn't require an adhesive or fastener to secure the insert 204 to the body 202.

In some embodiments, the body 202 and the insert 204 may be fabricated from a metal material, for example, stainless steel, carbon steel, or titanium. In some embodiments, the insert 204 may be fabricated from a metal material or a non-metal material, for example, nylon, glass fiber reinforced nylon, polyurethane, silicon, rubber, bulk molding compound, thermoplastics (e.g., thermoplastic urethane (TPU)), thermosets, resins, stainless steel, carbon steel, titanium, metal alloys, and combinations thereof. In some embodiments, the insert 204 may be fabricated from the same material as the body 202. In some embodiments, the insert 204 may be fabricated from a different material than the body 202.

Figure 13:
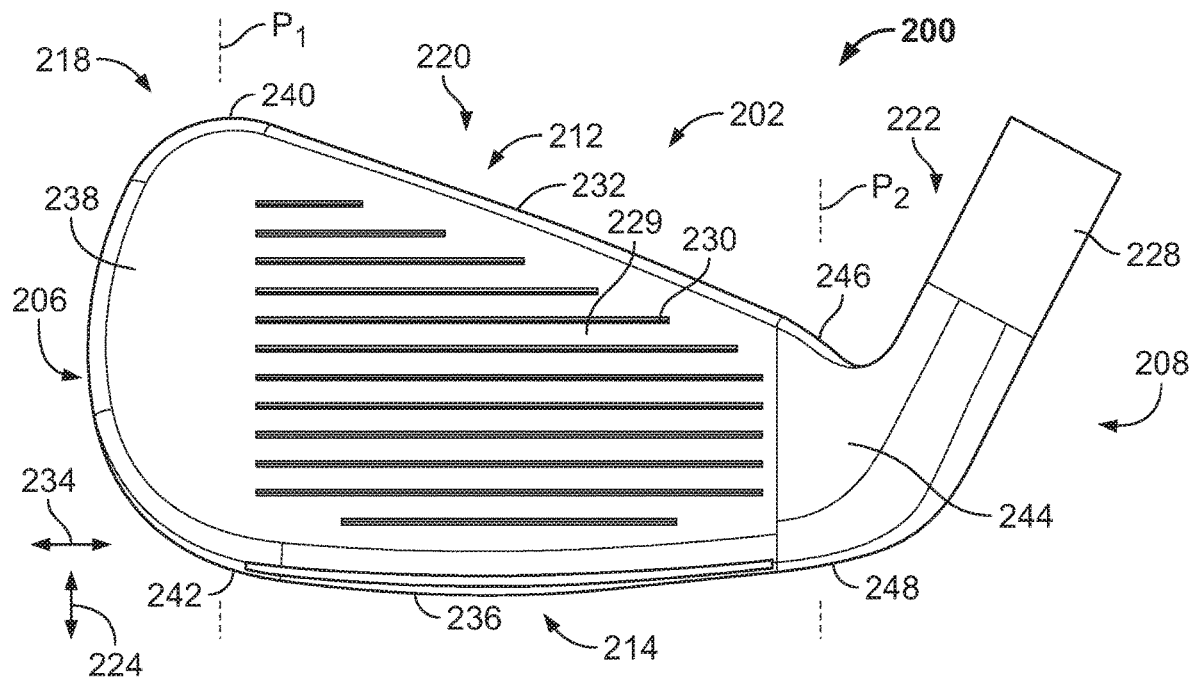
FIG. 13 is a front view of the golf club head of FIG. 11.
Figure 14:
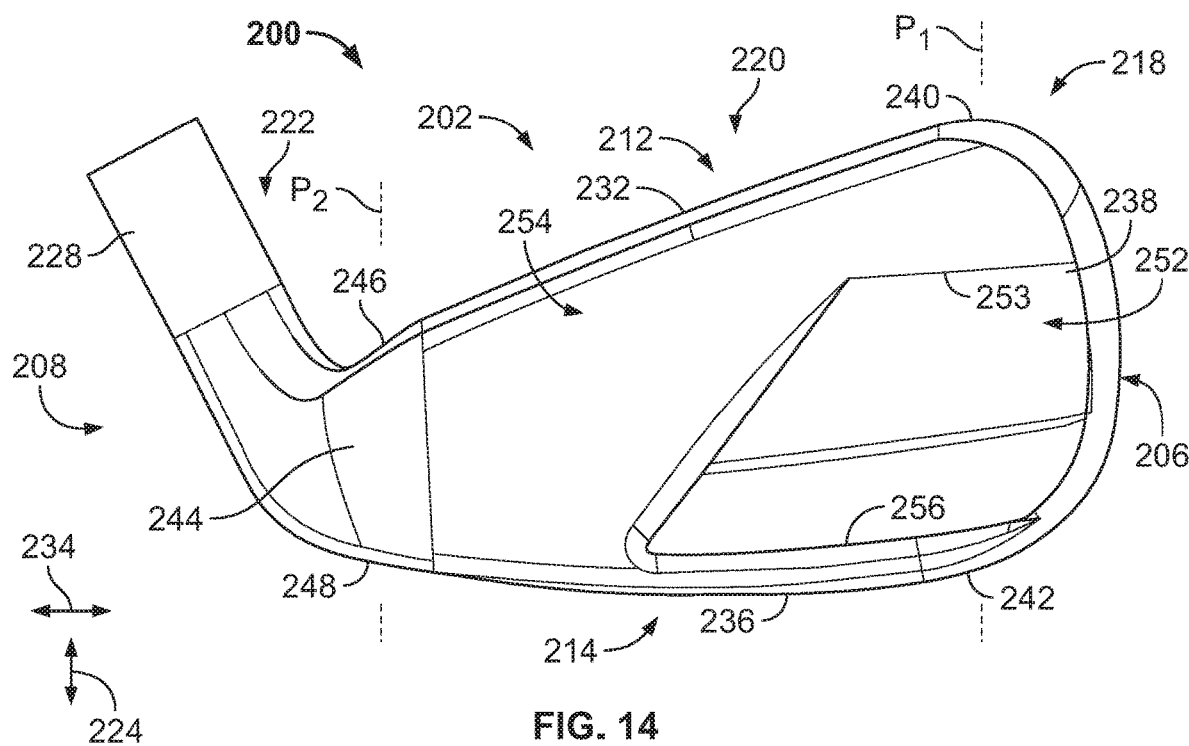
FIG. 14 is a rear view of the golf club head of FIG. 11.

The golf club head 200 defines a toe side 206, a heel side 208, a front side 210, a top side 212, a bottom side 214, and a rear side 216. The body 202 includes a toe region 218, a medial region 220, and a heel region 222. Referring specifically to FIGS. 13 and 14, the toe region 218, the medial region 220, and the heel region 222 are defined by lines or planes P1 and P2 that extend through the golf club head 200 in a sole-topline direction 224 (e.g., a vertical direction from the perspective of FIGS. 13 and 14). The toe region 218 and the heel region 222 are arranged at laterally-opposing ends of the body 202, and the medial region 220 is arranged laterally between the toe region 218 and the heel region 222.

The front side 210 of the body 202 may define a front face 226 that extends along the front side 210 of the body 202 from the toe region 218, through the medial region 220, and into at least a portion of the heel region 222. In some embodiments, the front face 226 may define an entire front surface of the body 202 that extends laterally from the toe region 218, through the medial region 220, and into the heel region 222 to a junction between the front surface and a hosel 228 extending from the heel region 222. In some embodiments, a portion of the front face 226 defined along the medial region 220 defines a ball-striking face 229, which may include a plurality of laterally-extending grooves 230 that are spaced from one another in the sole-topline direction 224 (see FIG. 13).

The golf club head 200 defines a topline 232 extending laterally in a heel-toe direction 234 (e.g., a horizontal direction from the perspective of FIGS. 13 and 14) along the top side 212, and a sole 236 extending laterally in the heel-toe direction 234 along the bottom side 214. The toe region 218 includes a toe portion 238 of the body 202 that is defined by a portion of the body 202 between a distal end of the toe side 206 and the plane P1. In some embodiments, the plane P1 may be defined along a lateral edge of the grooves 230 formed in the front side 210 that is adjacent to the toe side 206. In some embodiments, the plane P1 may intersect the top side 212 of the toe portion 238 at a toe-topline intersection point 240 along the topline 232 where the slope of a line tangent to the topline 232 is approximately zero (e.g., a point where a line tangent to the periphery of the top side 212 is approximately parallel to the ground at address). In these embodiments, the plane P1 may extend through the toe portion 238 in the sole-topline direction 224 to a toe-sole intersection point 242.

The heel region 222 includes a heel portion 244 of the body 202 that is defined by a portion of the body 202 between a distal end of the heel side 208 and the plane P2. In some embodiments, the plane P2 may be defined along a lateral edge of the grooves 230 formed in the front side 210 that is adjacent to the heel side 208. In some embodiments, the plane P2 may intersect the top side 212 at a heel-topline inflection point 246 (e.g., a point where the periphery of the top side 212 transitions from concave down to concave up). In these embodiments, the plane P2 may extend through the heel portion 244 in the sole-topline direction 224 to a heel-sole intersection point 248.

The heel portion 244 includes the hosel 228 that extends from the heel portion 244 at an angle (e.g., a lie angle formed between a plane parallel to the ground on which the club head rests at address and a center axis defined through the hosel 228) in a direction away from the toe portion 238. The hosel 228 defines a hosel cavity 250 (see FIG. 11) within which a shaft (not shown) may be inserted for coupling to the golf club head 200. In some embodiments, a ferrule (not shown) may abut or be at least partially inserted into the hosel 228. In some embodiments, the hosel cavity 250 may extend through at least a portion of the hosel 228.

The topline 232 may extend along an outer periphery of the top side 212 of the body 202 from the heel-topline inflection point 246, along the medial region 220, to the toe-topline intersection point 240. The sole 236 may extend along a periphery of the bottom side 214 of the body 202 from the toe-sole intersection point 242, along the medial region 220, to the heel-sole intersection point 248.

In some embodiments, the body 202 may include a rear cutout 252 that extends through a rear face 254 of the body 202, which is arranged along the rear side 216 of the body 202. In the illustrated embodiment, the rear cutout 252 may extend from the toe portion 238, in a direction toward the heel portion 244, to a location within the medial region 220 (see FIG. 14). The rear cutout 252 may be defined by an upper edge 253 and a lower edge 256. The upper edge 253 may initially extend in a direction generally normal to the distal end of the toe portion 238 and then angle toward the sole 236 to meet with the lower edge 256. The lower edge 256 may generally conform to a contour defined by the sole 236.

Figure 12:
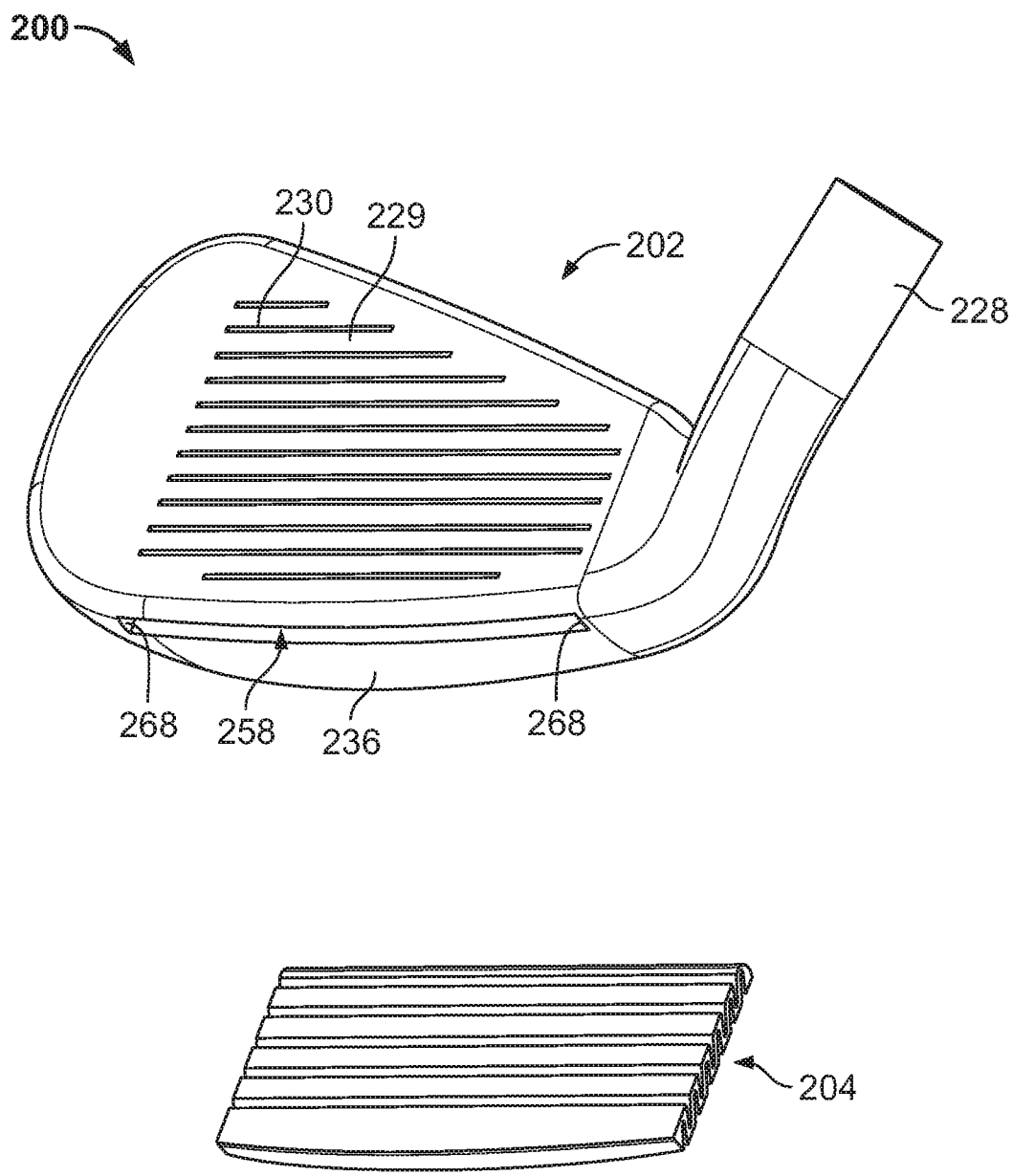
FIG. 12 is an exploded bottom, front, left isometric view of the golf club head of FIG. 11.
Figure 15:
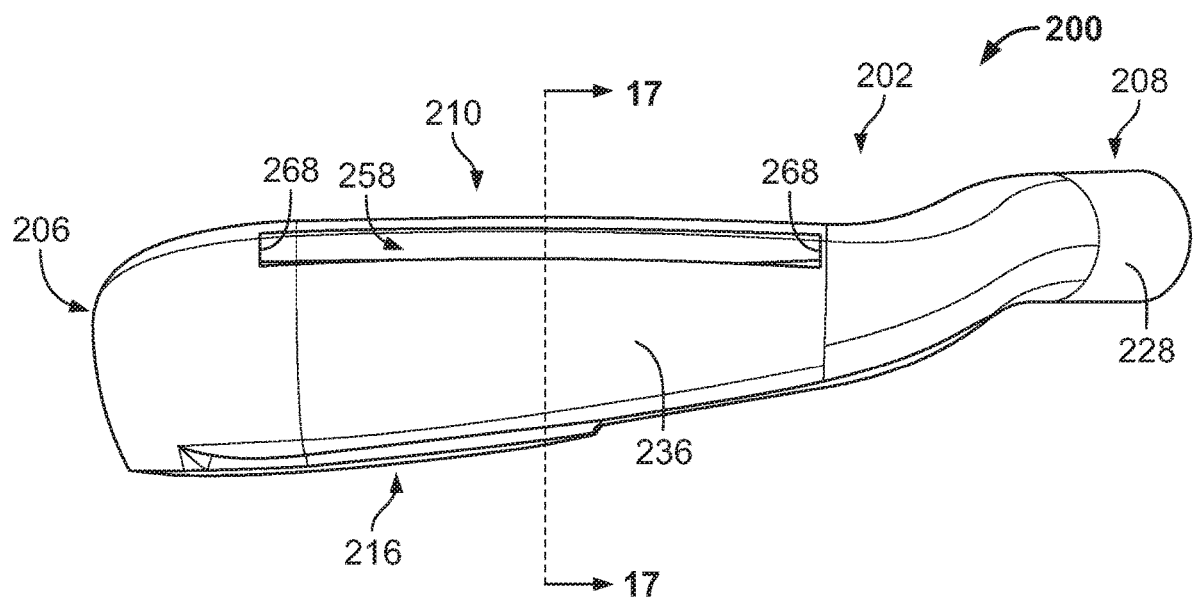
FIG. 15 is a bottom view of the golf club head of FIG. 11.
Figure 17:
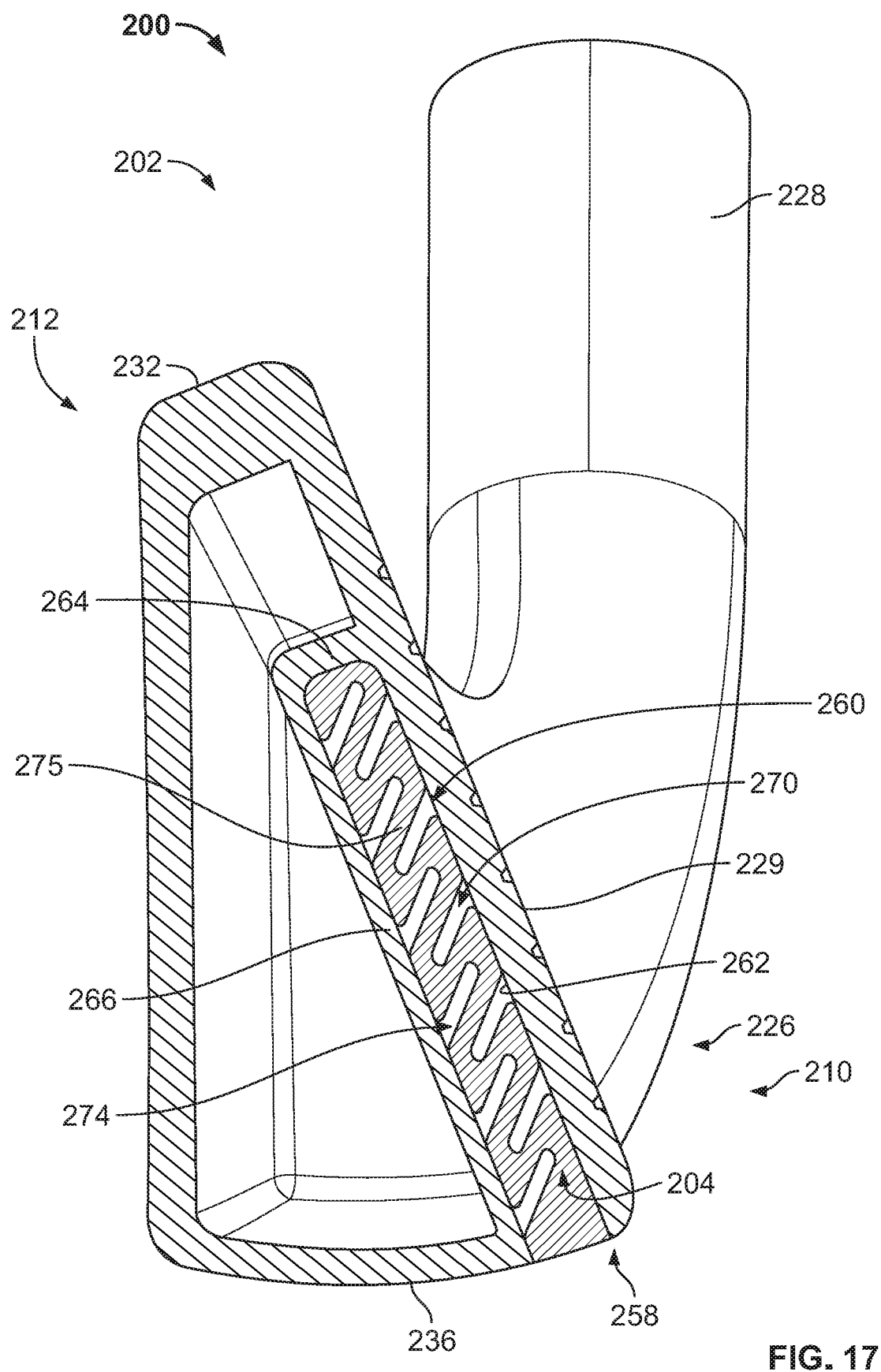
FIG. 17 is a cross-sectional view of the golf club head of FIG. 15 taken along line 17-17.
Figure 18:
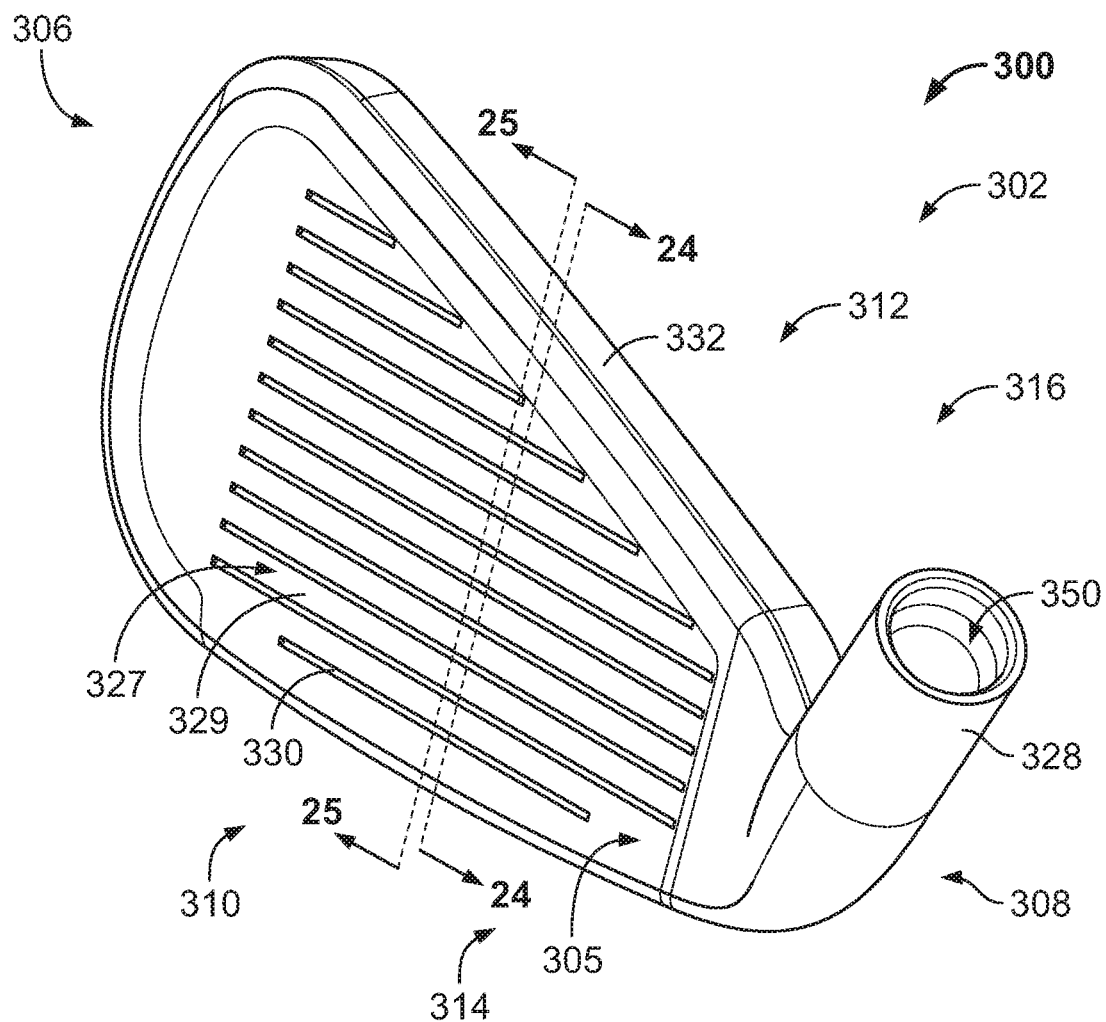
FIG. 18 is a top, front, left isometric view of a golf club head according to the present disclosure.
Figure 19:
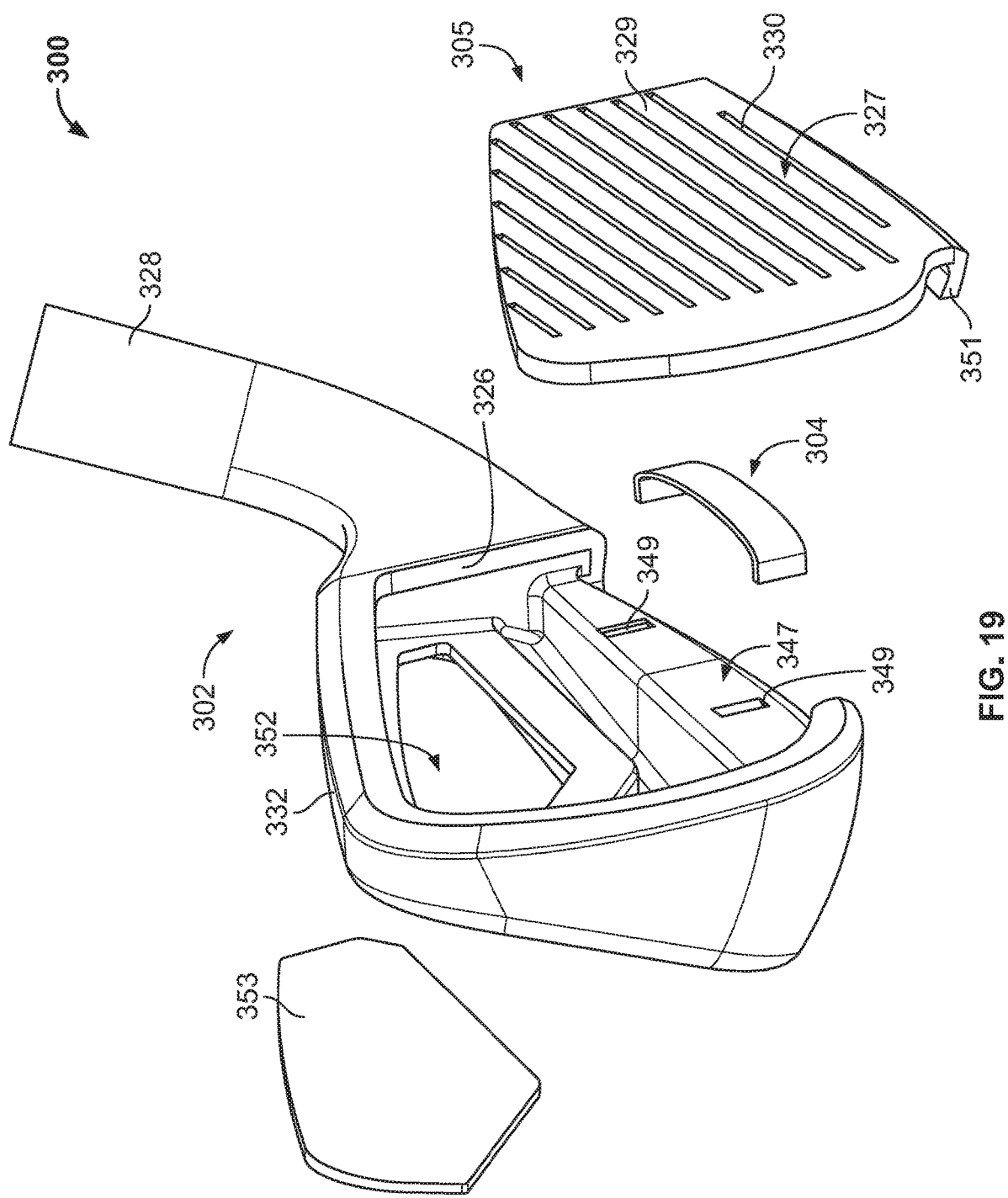
FIG. 19 is an exploded top, front, right isometric view of the golf club head of FIG. 18.

In some embodiments, the body 202 may include a sole cutout 258 that extends along the sole 236 in the heel-toe direction 234 (see FIGS. 12 and 15). The sole cutout 258 may extend along the sole 236 a distance that corresponds with a lateral width of the insert 204. In this way, for example, the sole cutout 258 may be configured to receive the insert 204 within the internal volume of the body 202 (see FIGS. 12 and 17). Referring to FIG. 17, the sole cutout 258 may provide access to an insert cavity or internal volume 260 defined within the body 202. The insert cavity 260 may be defined by a rear surface 262 of the ball-striking face 229, an internal top wall 264 that extends generally normal to the rear surface 262, an internal wall 266 that extends generally parallel to the rear surface 262, and opposing internal sidewalls 268 (see FIGS. 15 and 17).

Figure 16:
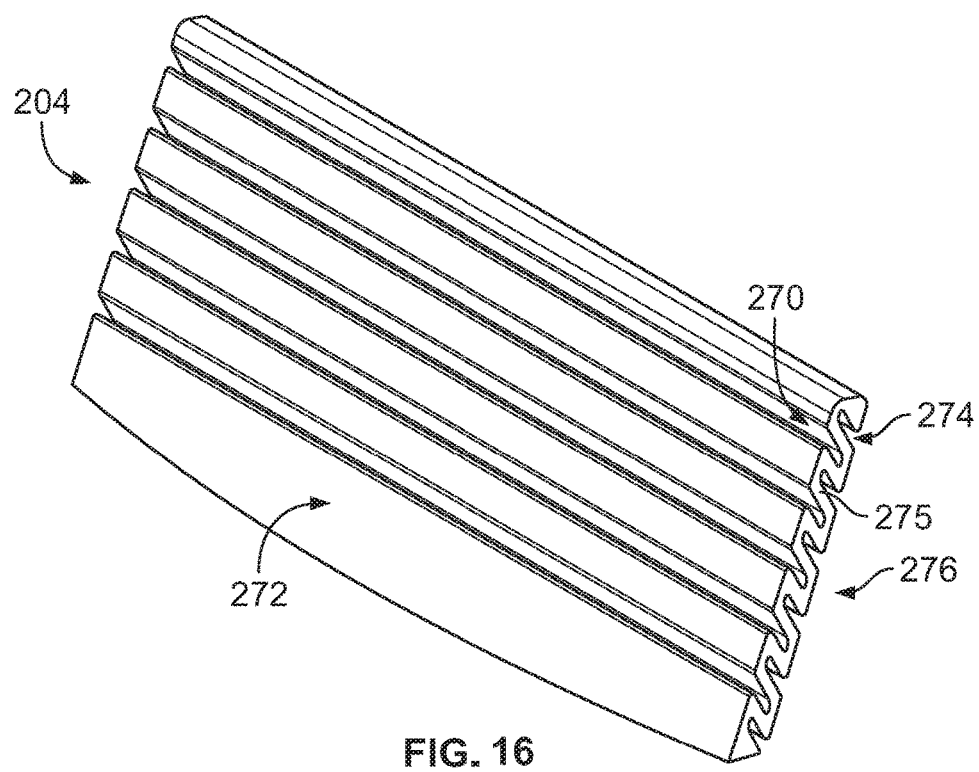
FIG. 16 is a top, front, left isometric view of an insert of the golf club head of FIG. 11.

With reference to FIGS. 16 and 17, in some embodiments, the insert 204 may be formed separately from the body 202 and coupled to or fastened within the insert cavity 260. Although the insert 204 and the body 202 are shown as separate components for the purposes of illustration, the insert and the body 202 may be formed integrally, layer by layer, via an additive manufacturing process. For example, the insert 204 may be formed, layer by layer, integrally with the rear surface 262, the internal wall 266, and the opposing sidewalls 268, which define the insert cavity 260. In other words, the insert 204 may be formed integrally with and attached to at least two opposing surfaces formed in the body 202. In this way, for example, the insert 204 may be formed within the body 202 without the need to additional fasteners or adhesives.

As described herein, the present disclosure may leverage additive manufacturing technology for constructing the insert 204. The insert 204 may include certain designs and geometries that are outside the realm of conventional machining and tooling techniques and processes. As a result of the nearly limitless variability in geometry provided by additive manufacturing technology, the insert 204 can include specific lattice structure, voids, undercuts, and/or kerfs designed to improve the characteristics and properties of the golf club head 200. For example, the insert 204 can define a specific geometry in which material is strategically removed (via lattice structures, voids, undercuts, and/or kerfs) to induce controlled movement and/or elastic deformation of the ball-striking face 229 to thereby effectively support the ball-striking face 229 upon impact with a golf ball, while still providing sound tuning and/or vibration damping so as to further improve sound and/or feel of the golf club head 200. In addition, the insert 204 may distribute impact energy when the ball-striking face 229 hits a golf ball, so that golf club head 200 maintains an overall cohesive form and good coefficient of restitution. This energy transfer can also be applied to counteract unwanted sidespin of the golf ball caused by off-center strikes.

In the illustrated embodiment, the insert 204 may define a generally zig-zag or S-shaped repeating pattern as the insert 204 extends from the sole 236 toward the internal top surface 264. This repeating pattern defined by the insert 204 may form a kerf-like structure that includes alternating voids or slots extending into the insert 204. Specifically, the insert 204 may include a first set of slots or voids 270 formed in a first side 272 of the insert 204 and a second set of slots or voids 274 formed in a second side 276 of the insert 204. When the insert 204 is inserted or integrated into the insert cavity 260, the insert 204 may be in engagement with or support the rear surface 262 of the ball-striking face 229. The first set of slots 270 may be arranged adjacent to the rear surface 262, and the second set of slots 274 may be arranged adjacent to the internal wall 266.

Each of the first set of slots 270 and the second set of slots 274 is angled relative to the corresponding rear surface 262 and the internal wall 266 arranged adjacent thereto. For example, each of the first set of slots 270 is angled relative to the internal wall 266 (e.g., angled relative to a direction normal to the internal wall 266), and each of the second set of slots 274 is angled relative to the rear surface 262 (e.g., angled relative to a direction normal to the rear surface 262). In general, the rotational orientation of the first set of slots 270 and the second set of slots 274 may control a stiffness of the ball-striking face 229. For example, in the arrangement illustrated in FIG. 17, the angle of the first set of slots 270 and the second set of slots 274 may provide the insert 204 with properties that to knock down spin and produce a low ball flight. If the orientation of the first set of slots 270 and the second set of slots 274 were rotated one hundred and eighty degrees, the insert 204 may be configured to provide higher spin rates and produce a higher ball flight. When the first set of slots 270 and the second set of slots 274 are oriented normal to the ball-striking face 229, the insert 204 may provide a greatest amount of stiffness to the ball-striking face 229. In some embodiments, a set of irons may be designed with varying orientations of the first set of slots 270 and the second set of slots 274 to provide varied ball flight characteristics throughout the iron set.

In the illustrated embodiment, the first set of slots 270 and the second set of slots 274 may alternate along the insert 204. For example, as the insert 204 extends from the sole 236 toward the internal top surface 264, one slot in the second set of slots 274 may be followed by one of the first set of slots 270, which may then be followed by another slot in the second set of slots 274, and so on. The alternative slots and the zig-zag or S-shaped pattern defined by the insert 204 may form segments or beams 275 that extend between and engage the rear surface 262 and the internal wall 266. The alternating slot pattern and corresponding beams 275 formed by the insert 204 may provide kerf-like or spring-like flexibility to the insert 204, which enables the insert 204 to distribute impact energy over the ball-striking face 229 and maintain overall cohesive form and good coefficient of restitution over the ball-striking face 229. These properties of the insert 204 counteract unwanted sidespin caused by off-center impacts and provide an overall more forgiving and consistent performance of the golf club head 200.

FIGS. 18-25 an iron-type golf club head 300 that may include a body 302 and an insert 304 configured to be arranged within the body 302 and a face insert 305 configured to be coupled to the body 302. In some embodiments, the golf club head 300 may be fabricated, layer by layer, via an additive manufacturing process. In some embodiments, the insert 304 may be fabricated, layer by layer, via an additive manufacturing process. In some embodiments, the insert 304 may be coupled to the body 302, for example, via an adhesive or fastener. In some embodiments, the insert 304 may be formed integrally with the body 302, layer by layer, via an additive manufacturing process, such that the insert 304 and body 302 are formed as a unitary component, which doesn't require an adhesive or fastener to secure the insert 304 to the body 302.

In some embodiments, the body 302 and/or the insert 304 may be fabricated from a metal material, for example, stainless steel, carbon steel, or titanium. In some embodiments, the insert 304 may be fabricated from a metal material or a non-metal material, for example, nylon, glass fiber reinforced nylon, polyurethane, silicon, rubber, bulk molding compound, thermoplastics (e.g., thermoplastic urethane (TPU)), thermosets, resins, stainless steel, carbon steel, titanium, metal alloys, and combinations thereof. In some embodiments, the insert 304 may be fabricated from the same material as the body 302. In some embodiments, the insert 304 may be fabricated from a different material than the body 302.

Figure 20:
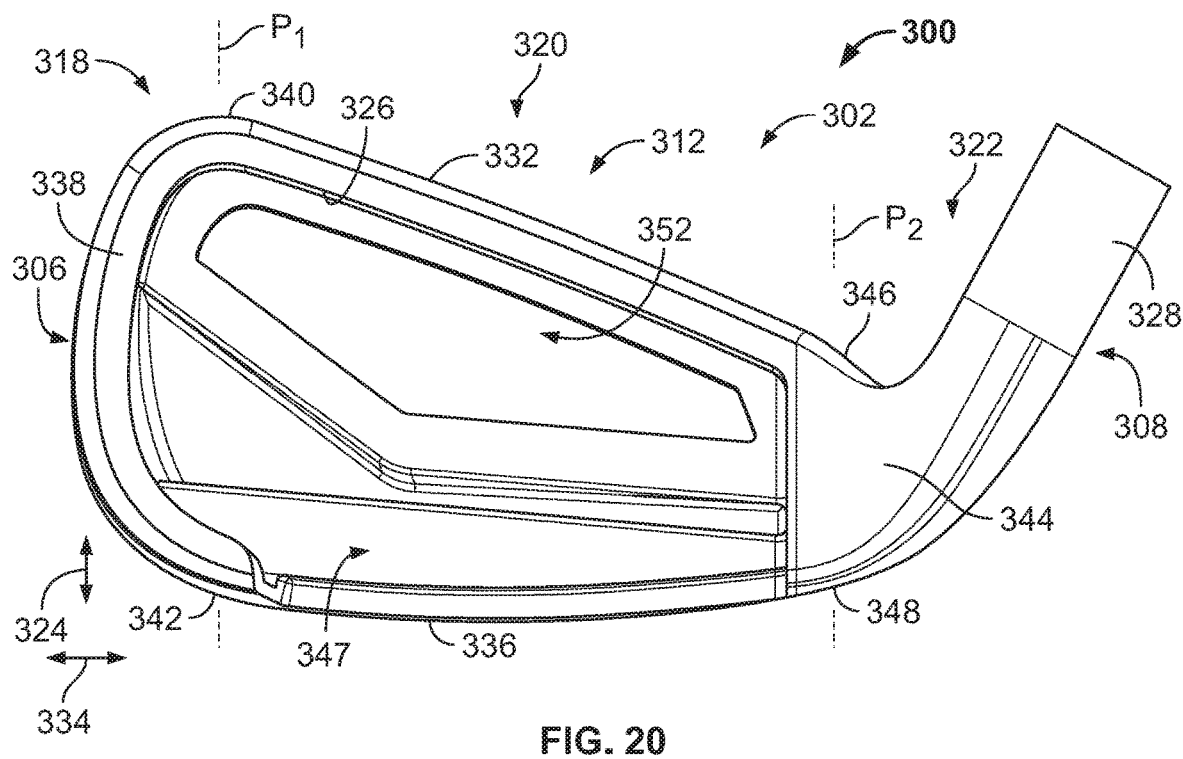
FIG. 20 is a front view of a body of the golf club head of FIG. 18.
Figure 21:
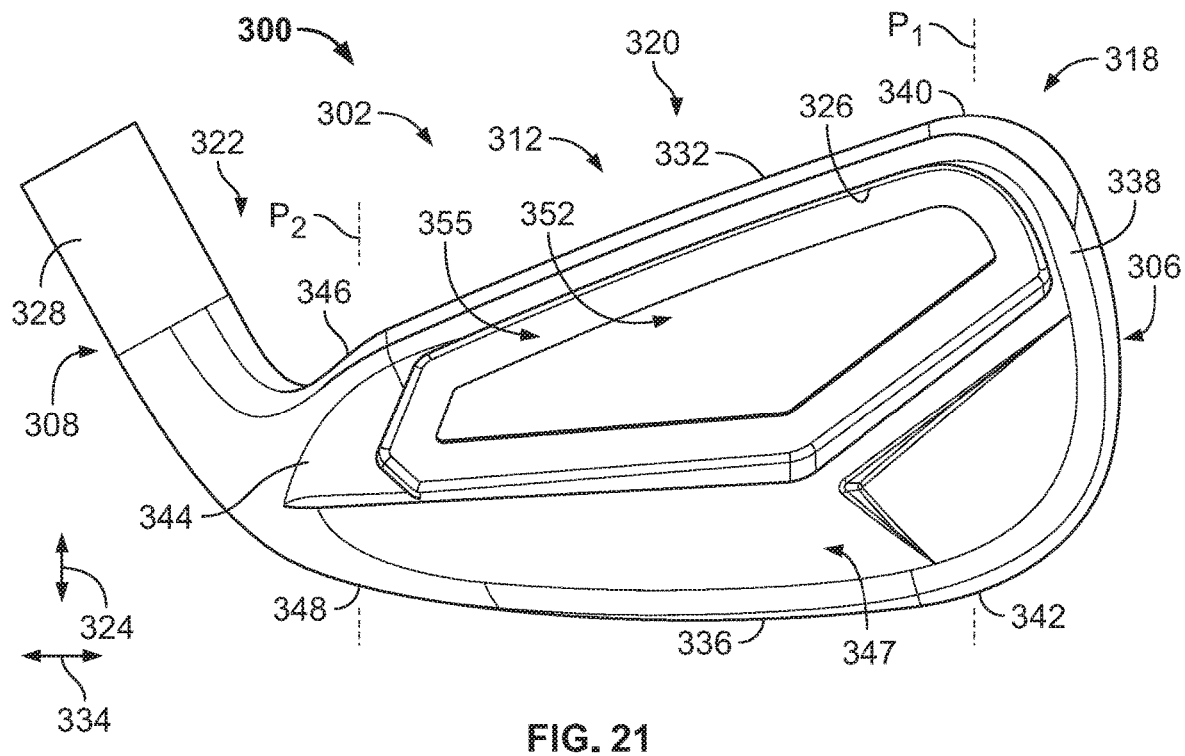
FIG. 21 is a rear view of the body of the golf club head of FIG. 18.

The golf club head 300 defines a toe side 306, a heel side 308, a front side 310, a top side 312, a bottom side 314, and a rear side 316. The body 302 includes a toe region 318, a medial region 320, and a heel region 322. Referring specifically to FIGS. 20 and 21, the toe region 318, the medial region 320, and the heel region 322 are defined by lines or planes P1 and P2 that extend through the golf club head 300 in a sole-topline direction 324 (e.g., a vertical direction from the perspective of FIGS. 20 and 21). The toe region 318 and the heel region 322 are arranged at laterally-opposing ends of the body 302, and the medial region 320 is arranged laterally between the toe region 318 and the heel region 322.

The front side 310 of the body 302 may define a cutout 326 that extends along a periphery of the front side 310 of the body 302 from the toe region 318 and into the medial region 320. In some embodiments, the cutout 326 may define an entire front surface of the body 302 that extends laterally from the toe region 318, through the medial region 320, and into the heel region 322 to a junction between the front surface and a hosel 328 extending from the heel region 322. In some embodiments, a front face 327 of the face insert 305 may defines a ball-striking face 329, which may include a plurality of laterally-extending grooves 330 that are spaced from one another in the sole-topline direction 324 (see FIG. 19).

The body 302 defines a topline 332 extending laterally in a heel-toe direction 334 (e.g., a horizontal direction from the perspective of FIGS. 20 and 21) along the top side 312, and a sole 336 extending laterally in the heel-toe direction 334 along the bottom side 314. The toe region 318 includes a toe portion 338 of the body 302 that is defined by a portion of the body 302 between a distal end of the toe side 306 and the plane P1. In some embodiments, the plane P1 may be defined along a lateral edge of the grooves 330 formed in the front side 310 that is adjacent to the toe side 306. In some embodiments, the plane P1 may intersect the top side 312 of the toe portion 338 at a toe-topline intersection point 340 along the topline 332 where the slope of a line tangent to the topline 332 is approximately zero (e.g., a point where a line tangent to the periphery of the top side 312 is approximately parallel to the ground at address). In these embodiments, the plane P1 may extend through the toe portion 338 in the sole-topline direction 324 to a toe-sole intersection point 342. In some embodiments, when the golf club head 300 is assembled, the front face 327 of the face insert 305 may extend into or define at least a portion of the toe portion 338.

The heel region 322 includes a heel portion 344 of the body 302 that is defined by a portion of the body 302 between a distal end of the heel side 308 and the plane P2. In some embodiments, the plane P2 may be defined along a lateral edge of the grooves 330 formed in the cutout 326 that is adjacent to the heel side 208. In some embodiments, the plane P2 may intersect the top side 312 at a heel-topline inflection point 346 (e.g., a point where the periphery of the top side 312 transitions from concave down to concave up). In these embodiments, the plane P2 may extend through the heel portion 344 in the sole-topline direction 324 to a heel-sole intersection point 348.

The heel portion 344 includes the hosel 328 that extends from the heel portion 344 at an angle (e.g., a lie angle formed between a plane parallel to the ground on which the club head rests at address and a center axis defined through the hosel 328) in a direction away from the toe portion 338. The hosel 328 defines a hosel cavity 350 (see FIG. 18) within which a shaft (not shown) may be inserted for coupling to the golf club head 300. In some embodiments, a ferrule (not shown) may abut or be at least partially inserted into the hosel 328. In some embodiments, the hosel cavity 350 may extend through at least a portion of the hosel 328.

The topline 332 may extend along an outer periphery of the top side 312 of the body 302 from the heel-topline inflection point 346, along the medial region 320, to the toe-topline intersection point 340. The sole 336 may extend along a periphery of the bottom side 314 of the body 302 from the toe-sole intersection point 342, along the medial region 320, to the heel-sole intersection point 348.

In the illustrated embodiment, the body 302 may include a bar 347 extending laterally in the heel-toe direction 334 at a location adjacent to the sole 336. In some embodiments, the bar 347 may be formed from solid material (e.g., metal) and may form at least a portion of the sole 336. The bar 347 may include laterally-separated insert slots 349 (see FIG. 19) that each define a recess in an internal surface or wall 357 defined by the bar 347 (e.g., a surface or wall facing the face insert 305). In some embodiments, the insert slots 349 may be configured to receive at least a portion of the insert 304 to secure the insert 304 within the body 302. In some embodiments, the body 302 may include a rear cutout 352 that extends through a rear face 355 of the body 302, which is arranged along the rear side 316 of the body 302. In some embodiments, the golf club head 300 may include a rear cover plate 353 that is configured to be attached the rear side 316 of the body 302 to cover the rear cutout 352 (see FIG. 19).

With reference to FIGS. 22-25, the face insert 305 may include a sole portion 351 that extends in a direction that is generally transverse to the ball-striking face 329 in a direction away from the ball-striking face 329. When the face insert 305 is attached to the body 302, the sole portion 351 may form at least a portion of the sole 336 (see FIGS. 24 and 25). For example, the sole portion 351 may extend from the front side 310 to a location between the front side 310 and the rear side 316 along the sole 336.

Figure 22:
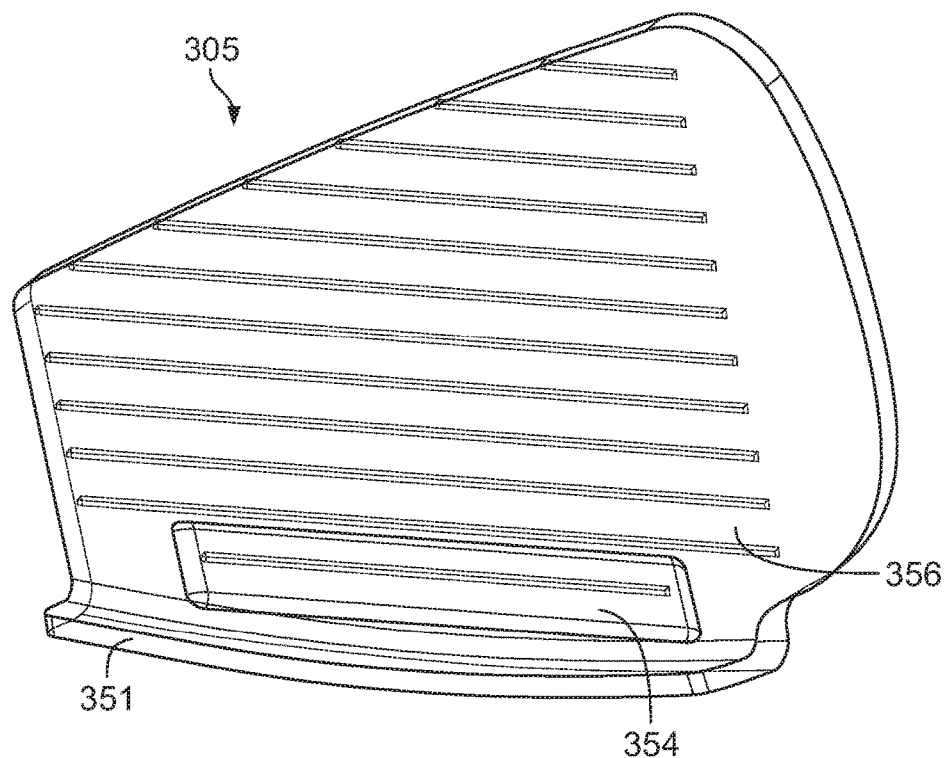
FIG. 22 is a top, back, right isometric view of a face insert of the golf club head of FIG. 18.

In the illustrated embodiment, the face insert 305 may define an insert recess 354 that is configured to receive and engage at least a portion of the insert 304 (see FIG. 22). In the illustrated embodiment, the insert recess 354 may be recessed into a rear surface 356. The general shape of the insert may conform to the shape of the insert 304. In the illustrated embodiment, the insert recess 354 extends in the heel-toe direction 334 along at least a portion of the rear surface 356, and is arranged at a location along the sole-topline direction 324 adjacent to the sole portion 351. In this embodiments, the insert 304 may be arranged at a location in the sole-topline direction 324 where most deflection occurs on the ball-striking face 329 during impact. In some embodiments, the insert 304 may be arranged in an alternate location along the sole-topline direction 324 to bias deflection of the ball-striking face 329. For example, the insert 304 may be arranged higher on the face (e.g., toward the topline 332) to support the upper half of the ball-striking face 329 and allow the lower half to flex more.

Figure 23:
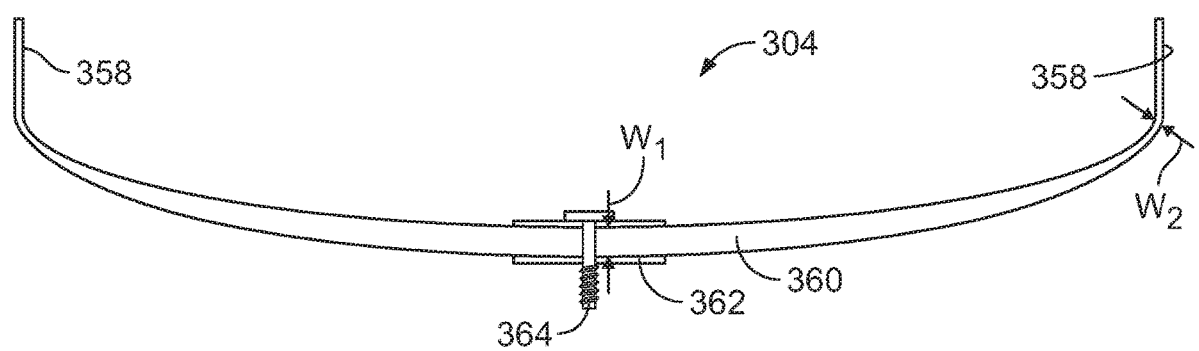
FIG. 23 is a top view of an insert of the golf club head of FIG. 18.

Referring specifically to FIG. 23, the insert 304 may define a generally arcuate or curved profile that includes mounting portions 358 that extend in a direction away from a body portion 360 of the insert 304. In the illustrated embodiment, the insert 304 may be in the form of an elastic beam or a leaf spring. The elastic beam or leaf spring-like structure may include one or more arcuate layers made by additive manufacturing. The body portion 360 of the insert 304 may extend laterally between the mounting portions 358 and may define a varying thickness or width along the body portion 360. For example, the body portion 360 may define a first width $W_1$ at a center point thereof, and the body portion 360 may decrease in width to a second width $W2$ defined at opposing ends of the body portion 360 adjacent to the mounting portions 358. This varying width defined by the insert 304 may aid in supporting the ball-striking face 329 to distribute impact energy over the ball-striking face 329 and maintain overall cohesive form and good coefficient of restitution over the ball-striking face 329. In addition, the cross-section width that varies along the lateral length of the insert 304 giving progressive spring rates throughout the length of the insert 304. This enables the ability to control how the material provides a spring effect to in turn control how the ball reacts when impacted in different spots on the ball-striking face 329.

In the illustrated embodiment, the insert 304 may include a bracket 362 and a fastener 364 (e.g., a screw, bolt, rivet, adhesive, or any similar fastener) that may facilitate coupling of the insert 304 to the face insert 305. For example, the mounting portions 358 may be at least partially inserted into the insert slots 349 of the body 302 and the center of the body portion 360 may be coupled to the face insert 305 with the fastener 364. In some embodiments, the insert 304 may be formed integrally, layer by layer, with the body 302 and/or the face insert 305 via additive manufacturing. In these embodiments, the insert slots 349 and the fastener 364 may not be required since the insert 304 may be formed integrally with (e.g., as a unitary component) the body 302.

Figure 24:
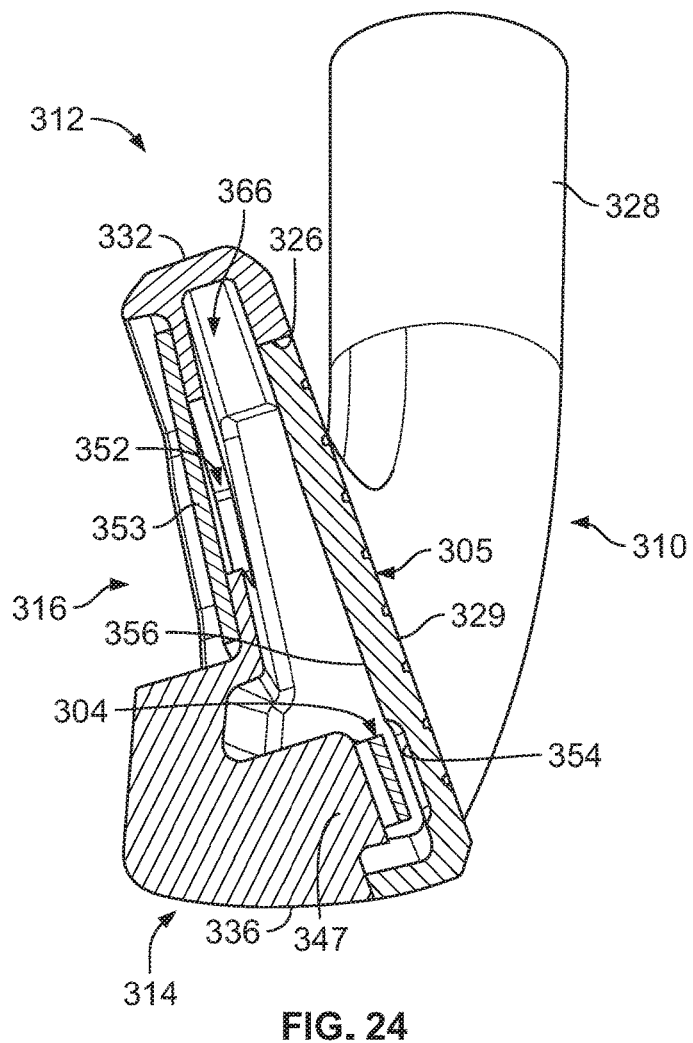
FIG. 24 is a cross-sectional view of the golf club head of FIG. 18 taken along line 24-24.
Figure 25:
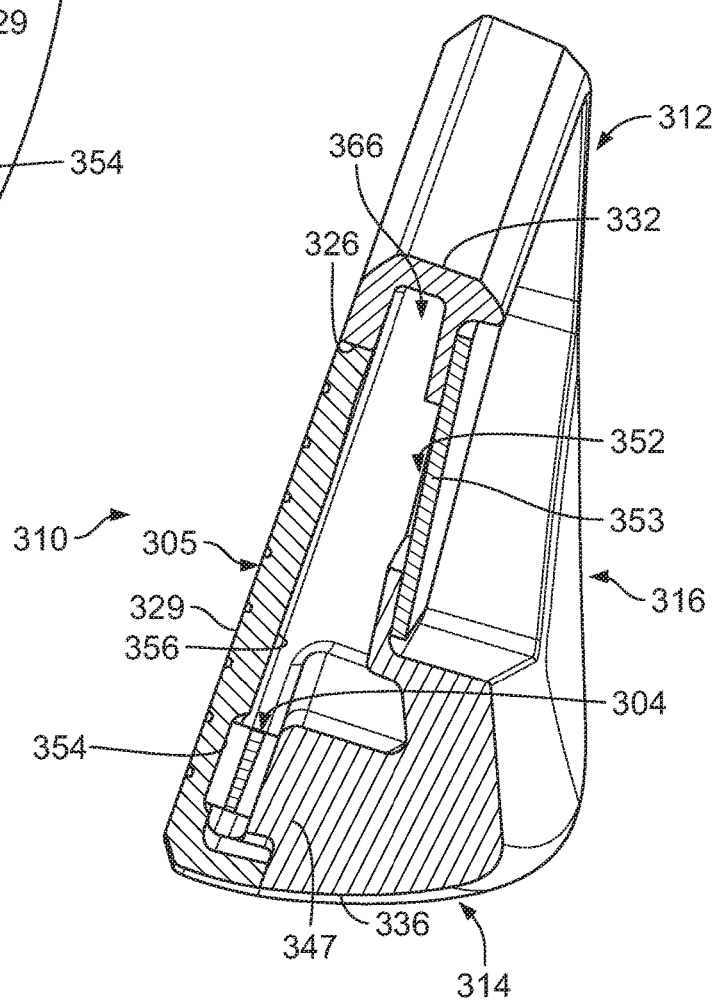
FIG. 25 is a cross-sectional view of the golf club head of FIG. 18 taken along line 25-25.

With specific reference to FIGS. 24 and 25, when the golf club head 300 is manufactured the body 302 may define an internal volume or cavity 366 that is enclosed by the body 302, the face insert 305, and the cover plate 353. The insert 304 may be arranged within the internal volume or cavity 366 when the golf club head 300 is assembled. In some embodiments, the golf club head 300 may be in the form of a muscle back and may not include an internal cavity. In general, the arcuate or curved profile defined by the body portion 360 of the insert 304 may bring at least a portion of the insert 304 into engagement with the face insert 305. For example, at least a portion of the body portion 360 of the insert 304 may engage the insert recess 354 formed in the face insert 305. In this way, the flexibility of the insert 304 may support or provide a biasing force against the face insert 305, which provides controlled movement and/or elastic deformation of the ball-striking face 329 to thereby effectively support the ball-striking face 329 upon impact with a golf ball, while still providing sound tuning and/or vibration damping so as to further improve sound and/or feel of the golf club head 300. In addition, the support/elasticity provided by the insert 304 may maintain overall cohesive form and good coefficient of restitution over the ball-striking face 329. These properties of the insert 304 counteract unwanted sidespin caused by off-center impacts and provide an overall more forgiving and consistent performance of the golf club head 300.

Figure 26:
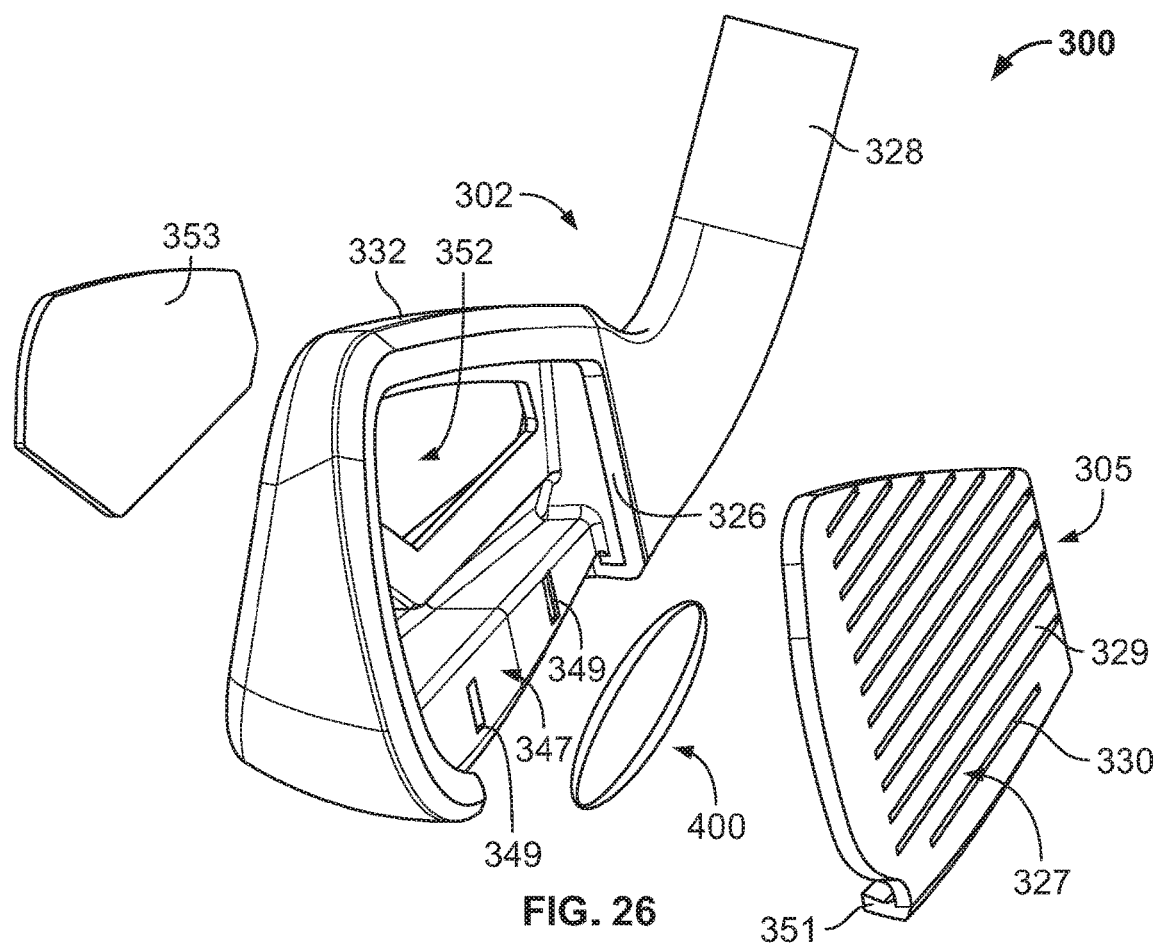
FIG. 26 is an exploded top, front, right isometric view of the golf club head of FIG. 18 with an oval insert.
Figure 27:
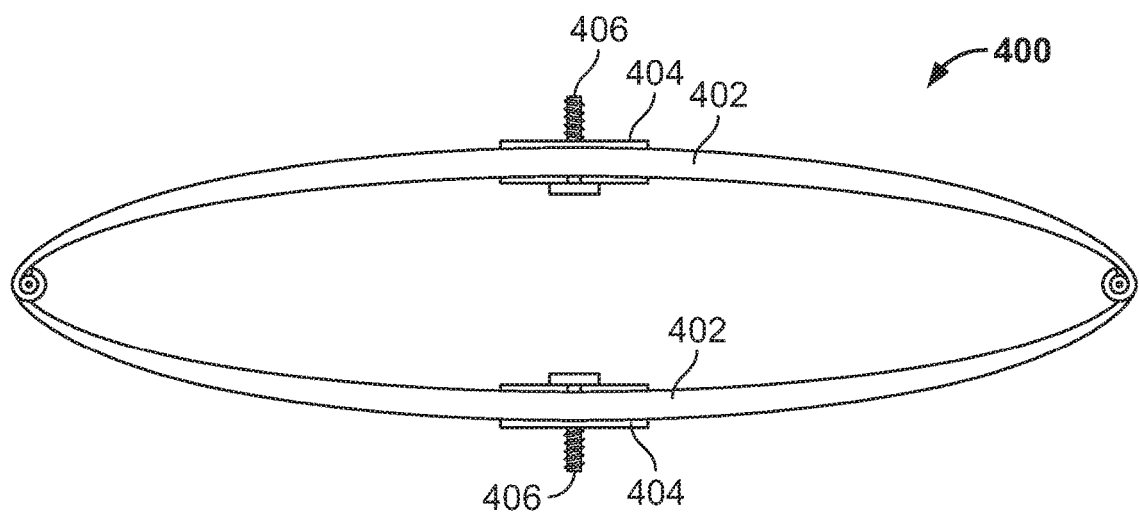
FIG. 27 is a top view of the oval insert of FIG. 26.

In other embodiments, the shape and structure of the insert 304 may vary. For example, FIGS. 26 and 27 illustrate an embodiment of an insert 400 in the form of an oval-shaped elastic beam or leaf spring. The insert 400 may include opposing body portions 402 that define a curved or arced profile. Similar to the insert 304 of FIG. 23, the body portions 402 may define a varying width that increases from a maximum width at a lateral center of the body portions 402 to a minimum at the lateral ends of the body portions 402. In the illustrated embodiment, the generally "parabolic" design of the insert 400 may define a variable spring rate along the lateral length of the insert 400, which enables the ability to control how the material provides a spring effect to in turn control how the ball reacts when impacted in different spots on the ball-striking face 329.

In the illustrated embodiment, each of the body portions 402 may include a bracket 404 and a fastener 406 (e.g., a screw, bolt, rivet, adhesive, or any similar fastener) that may facilitate coupling of the insert 400 to the face insert 305 and the body 302. For example, one of the body portions 402 may be coupled to the bar 347 and one of the body portions 402 may be coupled to the face insert 305. In some embodiments, the insert 400 may be formed integrally, layer by layer, with the body 302 and/or the face insert 305 via additive manufacturing. In these embodiments, fasteners 406 may not be required.

Figure 28:
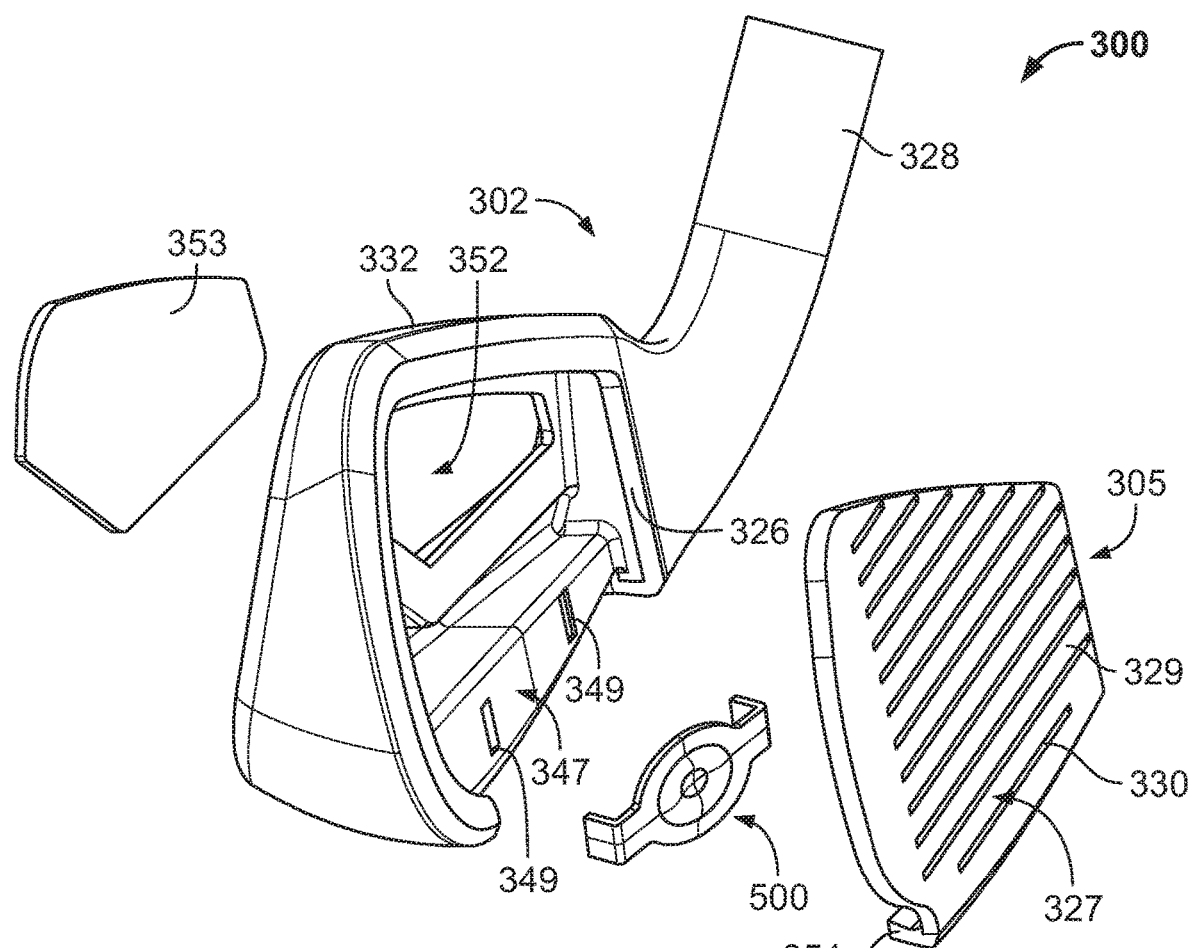
FIG. 28 is a is an exploded top, front, right isometric view of the golf club head of FIG. 18 with an insert having an oval-shaped center portion.
Figure 29:
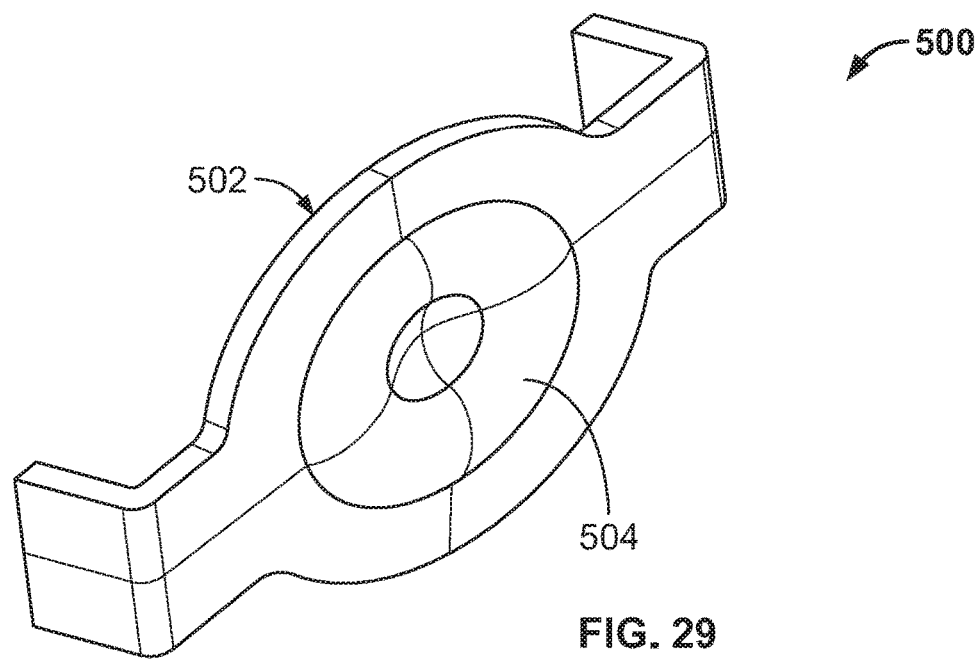
FIG. 29 is a top, front, right isometric view of the insert of FIG. 28.

FIGS. 28 and 29 illustrate an embodiment of an insert 500 in the form of an elastic beam or leaf spring that includes a rounded or oval-shaped center portion 502. The center portion 502 includes a bulb 504 that extends outwardly from the center portion 502 and defines a generally oval shape that conforms to the shape of the center portion 502. The center or middle portion of the bulb 504 may define an arcuate or curved recess formed in the insert 500. In general, the oval-shaped center portion 502 may provide support over a larger area of the ball-striking face 329, which may enhance durability and feel, and allow the lateral sides of the insert 500 to provide increased flexibility.

Figure 30:
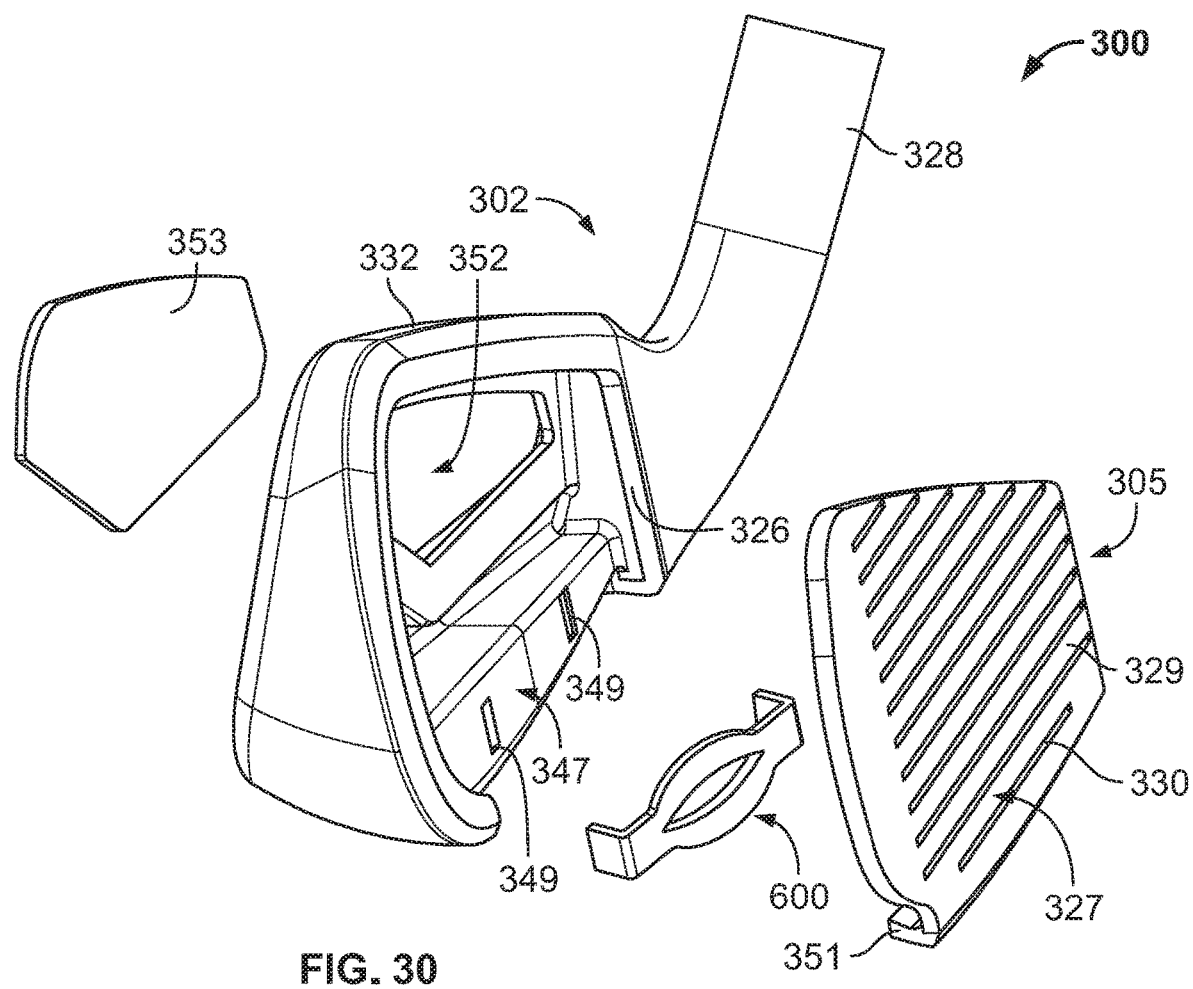
FIG. 30 is a is an exploded top, front, right isometric view of the golf club head of FIG. 18 with an insert with a cutout.
Figure 31:
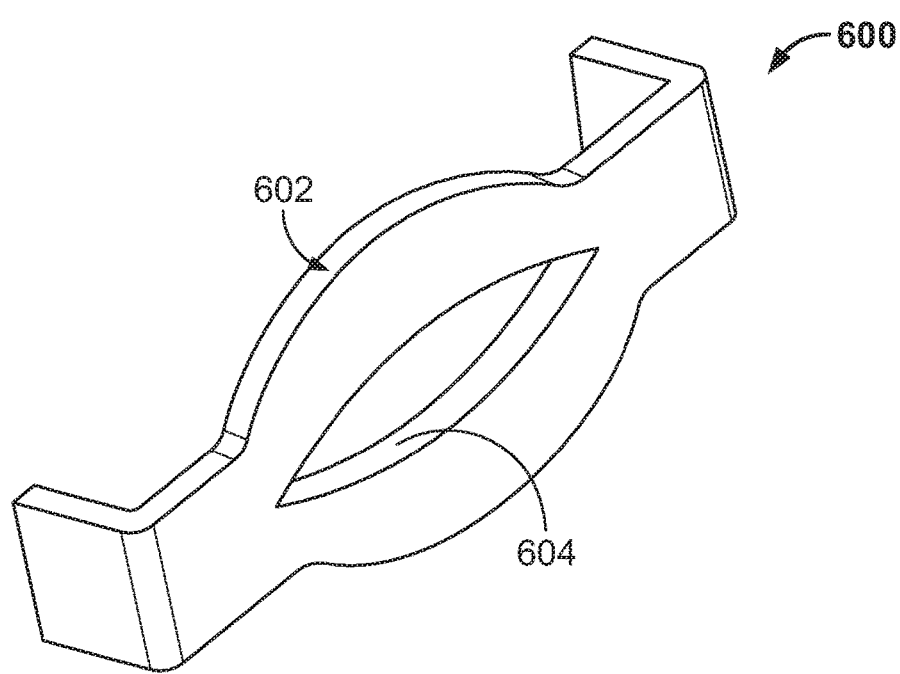
FIG. 31 is a top, front, right isometric view of the insert of FIG. 30.

FIGS. 30 and 31 illustrate an embodiment of an insert 600 in the form of an elastic beam or leaf spring that includes a rounded or oval-shaped center portion 602. The center portion 602 includes cutout 604 that extends through the center portion 602 defines a generally convex shape that conforms to the shape of the center portion 602. In general, the inert 600 may provide the same benefits as the insert 500, but may define a decreased weight due to the cutout 604.

In some embodiments, to manufacture a golf club insert or golf club head according to the present disclosure, a model of the golf club head and/or the insert may be created in a computer-assisted drawing (CAD) program. The CAD model may be converted to a format that support additive manufacturing (e.g., a stereolithographic (STL) file or a .3MF file), and then print the model using a 3-D printing technique disclosed herein. The parameters of the printed golf club head and/or insert may be measured and tested, and the CAD model may be adjusted accordingly.

The 3-D printer may be operated to 3-D print parts of an insert according to the present disclosure together, in a "single path." Unlike materials are printed together (e.g., a first material embedded within another, a first material abutting another, or a seamless transition from the first material to the second material), the 3-D printer can operate to change between filaments to 3-D print the first and second (and any additional) materials together. Alternatively or additionally, a golf club head and corresponding insert according to the present disclosure may be 3-D printed from a metal material as a unitary component.

In some embodiments, the inserts according to the present disclosure are customizable to offer the performance improvements at differing levels of feel (i.e., firm or soft), based on golfer preference. The lattice structure and the corresponding ball-striking face of the golf club head can be adjusted in both material and design to achieve a softer or firmer feel. The material, hardness, and thickness of both the ball-striking face and the lattice beams, and the overall size or thickness of the insert can contribute to the feel and sound that the golfer realizes during impact. Different insert designs can be created to provide a range of different feel/sound results, according to individual golfer preference.

To take advantage of this customizability, inserts and the corresponding golf club heads of the present invention could be made on demand, and the underlying lattice design can be adjusted on an individual basis to suit the needs of a particular golfer. A golfer can be led through a fitting process to determine the appropriate insert material, lattice design, ball-striking face thickness, and overall feel and performance. Then a unique insert specifically for that golfer can be printed on demand. This is yet another advantage of 3-D printing the insert since no expensive tooling needs to be created to make the part.

As described herein. due to the design of the golf club face inserts described herein, the disclosed geometries and structures can be designed and manufactured using additive manufacturing technology. For example, in some embodiments, an insert may be fabricated from any suitable material that can be used with 3D printing technologies, such as fused filament fabrication (FFF) for example, and further provide the desired performance characteristics, including those described herein.

Fused filament fabrication (FFF) is an additive manufacturing technology useful for modeling, prototyping, and production applications. It is one of the techniques of 3-D printing. FFF works on an additive principle by laying down material in layers; a filament or wire is unwound from a coil and supplies material to produce a part. FFF is also sometimes called fused deposition modeling (FDM) or plastic jet printing (PJP). FFF begins with a software process, which processes a file in the stereolithographic file format (STL) or .3MF format, mathematically slicing and orienting the model for the build process. The part is produced by extruding small flattened strings of molten material to form layers as the material hardens immediately after extrusion from the nozzle. A filament is unwound from a coil and supplies material to an extrusion nozzle which can turn the flow on and off. There is typically an accurately controlled drive that pushes the filament into the nozzle. The nozzle is heated to melt the material. The materials are then deposited by an extrusion head.

The nozzle can be moved in both horizontal and vertical directions by a numerically controlled mechanism. The nozzle follows a tool-path controlled by a computer-aided manufacturing (CAM) software package, and the part is built, one layer at a time. Stepper motors or servo motors are typically employed to move the extrusion head. The mechanism used is often an X-Y-Z rectilinear design, although other approaches may be employed. FFF is compatible with a variety of materials including, for example, Acrylonitrile Butadiene Styrene (ABS), Polylactic acid (PLA), Polycarbonate (PC), Polyamide (PA), Polystyrene (PS), lignin, rubber, PEEK, and metals.

In some embodiments, a TPU filament is advantageous because it has resistance to abrasion, ability to perform at low temperature, elasticity, and mechanical properties along with rubber-like elasticity. ABS (Acrylonitrile Butadiene Styrene) has strong material properties that produce parts with high impact, high-temperature resistance. Carbon filament is capable of printing strong and durable parts and often contains additional printing materials within its composition (ABS, PETG, NYLON etc.) depending on the product needed. Engineering PLA (Polylactic Acid) is a biodegradable plastic that was formulated to provide greater durability than standard PLA without compromising on its eases of use when printing. Some filaments use a combination of plastic and rubber for the creation of flexible prints with elastic properties. Polyethylene terephthalate is considered the bridge in terms of mechanical properties between PLA and ABS, offering strength, impact resistance and chemical resistance without having issues like warping. Having similar properties to PLA and ABS, PETG is a great filament for a number of applications that require more durability than PLA can offer, while being easier to print with than ABS.

Clear or transparent TPU filaments are available as well. In some embodiments it is advantageous to make the lattice technology visible from the outside of the club. This design element may be desirable to the golfer. In some embodiments, the lattice portion can be 3-D printed as described above, and then a secondary operation can be conducted to attach a clear TPU face, or mold the clear TPU face directly onto the 3D printed part. Optionally, the rear surface portion can be printed in clear TPU.

Many 3-D printers have the ability to print in a polymer or similar material such as acrylonitrile butadiene styrene (ABS), carbon (e.g., often carbon filaments or similar material in a plastic or polymer matrix), engineering polylactic acid (E-PLA), flexible combinations of plastic and rubber, high-impact polystyrene (HIPS), co-polyester (CPE), nylon, polyethylene terephthalate (PETG), polypropylene (PP), and scaffold soluble support filament (for complex geometric parts). In some embodiments, the inserts of the present disclosure may be fabricated from additively manufactured filaments formed from a material comprising wood, metallic filaments, carbon fiber reinforced PLA/ABS/Nylon, Magnetic iron PLA, RUBBERPLAY, TPU, or nylon.

Any of the embodiments described herein may be modified to include any of the structures or methodologies disclosed in connection with different embodiments. Further, the present disclosure is not limited to club heads of the type specifically shown. Still further, aspects of the club heads of any of the embodiments disclosed herein may be modified to work with a variety of golf clubs.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. Various features and advantages of the invention are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A golf club head, comprising:
a body defining a top side, a toe side, and a heel side and including a sole extending between the toe side and the heel side at a location on the body opposite to the top side, wherein the body defines an internal volume defined between a ball-striking face and an internal wall, and wherein the body is formed layer by layer via an additive manufacturing process; and
an insert arranged within the internal volume and formed layer by layer via the additive manufacturing process, wherein the insert includes a lattice structure arranged between a rear surface of the ball-striking face and the internal wall, wherein the lattice structure includes a plurality of beams and varies in a thickness defined by the plurality of beams laterally along the insert, and wherein the lattice structure is in engagement with both the rear surface and the internal wall, and is formed integrally with the ball-striking face and the internal wall of the body.

2. The golf club head of claim 1, wherein the lattice structure includes the plurality of beams extending between and in engagement with the rear surface and the internal wall.

3. The golf club head of claim 2, wherein the lattice structure defines a plurality of unit cells and varies in at least one of a unit cell type, a unit cell geometry, a unit cell size, a length defined by the plurality of beams a volume defined by the plurality of beams, and unit cell density at one or more locations along the insert.

4. The golf club head of claim 1, wherein the thickness of the plurality of beams increases adjacent to the toe side and the heel side, which provides an increased coefficient of restitution adjacent to the heel side and the toe side of the ball-striking face.

5. The golf club head of claim 1, wherein the lattice structure defines a plurality of curved contours each including the plurality of beams and a plurality of voids formed between adjacent pairs of the plurality of beams.

6. The golf club head of claim 1, wherein the lattice structure includes a first plurality of voids or slots formed in a first side thereof, and a second plurality of voids or slots formed in a second side thereof, and wherein the first plurality of voids or slots are angled relative to the rear surface and the second plurality of voids or slots are angled relative to the internal wall.

7. A golf club head, comprising:
a body defining a top side, a toe side, and a heel side and including a sole extending between the toe side and the heel side at a location on the body opposite to the top side, wherein the body defines an internal volume defined between a ball-striking face and an internal wall; and
an insert arranged within the internal volume and formed layer by layer via an additive manufacturing process, wherein the insert includes a plurality of beams connected between a rear surface of the ball-striking face and the internal wall, the plurality of beams defining a plurality of voids formed within the insert, wherein the plurality of beams are formed integrally with the ball-striking face and the internal wall, and wherein the sole includes a cutout configured to provide access to at least a portion of the insert.

8. The golf club head of claim 7, wherein the plurality of beams vary in at least one of a length, a thickness, and a volume at one or more locations along the insert.

9. The golf club head of claim 8, wherein the plurality of beams vary in the thickness defined by the plurality of beams laterally along the insert.

10. The golf club head of claim 9, wherein the thickness of the plurality of beams increases adjacent to the toe side and the heel side, which provides an increased coefficient of restitution adjacent to the heel side and the toe side of the ball-striking face.

11. The golf club head of claim 7, the insert defines a first plurality of voids or slots formed in a first side thereof, and a second plurality of voids or slots formed in a second side thereof.

12. The golf club head of claim 11, wherein the first plurality of voids or slots are angled relative to the rear surface and the second plurality of voids or slots are angled relative to the internal wall.

13. The golf club head of claim 11, wherein each of the plurality of beams extends between an adjacent pair of the first plurality of voids or slots and the second plurality of voids or slots.

14. The golf club head of claim 7, wherein the body is formed layer by layer via an additive manufacturing process and the plurality of beams are formed integrally with the body.

15. A golf club head, comprising:
a body defining a top side, a toe side, and a heel side and including a sole extending between the toe side and the heel side at a location on the body opposite to the top side, wherein the body defines an internal volume defined between a ball-striking face and an internal wall; and
an insert arranged within the internal volume and formed layer by layer via an additive manufacturing process, wherein the insert comprises an elastic beam that is configured to elastically support a rear surface of the ball-striking face, wherein lateral ends of the elastic beam engage the internal wall, and wherein the insert is formed integrally with the internal wall.

16. The golf club head of claim 15, wherein the elastic beam defines a varying thickness along a lateral length of the elastic beam.

17. The golf club head of claim 15, wherein the elastic beam decreases in thickness toward lateral ends thereof.

18. A golf club head, comprising:
a body defining a top side, a toe side, and a heel side and including a sole extending between the toe side and the heel side at a location on the body opposite to the top side, wherein the body defines an internal volume defined between a ball-striking face and an internal wall; and an insert arranged within the internal volume and formed layer by layer via an additive manufacturing process, wherein the insert includes a lattice structure arranged between a rear surface of the ball-striking face and the internal wall, and wherein the lattice structure includes a plurality of beams extending between and in engagement with both the rear surface and the internal wall, and is formed integrally with the ball-striking face and the internal wall, wherein the lattice structure defines a plurality of unit cells and varies in a unit cell density at one or more locations.

19. The golf club head of claim 18, wherein the lattice structure varies in at least one of a unit cell type, a unit cell geometry, a unit cell size, a length defined by the plurality of beams, a thickness defined by the plurality of beams, and a volume defined by the plurality of beams at one or more locations.

20. The golf club head of claim 19, wherein the lattice structure varies in the thickness defined by the plurality of beams laterally along the insert.

21. The golf club head of claim 20, wherein the thickness of the plurality of beams increases adjacent to the toe side and the heel side, which provides an increased coefficient of restitution adjacent to the heel side and the toe side of the ball-striking face.

22. A golf club head, comprising:
a body defining a top side, a toe side, and a heel side and including a sole extending between the toe side and the heel side at a location on the body opposite to the top side, wherein the body defines an internal volume defined between a ball-striking face and an internal wall; and an insert arranged within the internal volume and formed layer by layer via an additive manufacturing process, wherein the insert includes a lattice structure arranged between a rear surface of the ball-striking face and the internal wall, and wherein the lattice structure is in engagement with both the rear surface and the internal wall, and is formed integrally with the ball-striking face and the internal wall, wherein the lattice structure defines a plurality of curved contours each including a plurality of beams and a plurality of voids formed between adjacent pairs of the plurality of beams.

23. The golf club head of claim 22, wherein the lattice structure varies in the thickness defined by the plurality of beams laterally along the insert.

24. The golf club head of claim 23, wherein the thickness of the plurality of beams increases adjacent to the toe side and the heel side, which provides an increased coefficient of restitution adjacent to the heel side and the toe side of the ball-striking face.

25. A golf club head, comprising:
a body defining a top side, a toe side, and a heel side and including a sole extending between the toe side and the heel side at a location on the body opposite to the top side, wherein the body defines an internal volume defined between a ball-striking face and an internal wall; and an insert arranged within the internal volume and formed layer by layer via an additive manufacturing process, wherein the insert includes a lattice structure arranged between a rear surface of the ball-striking face and the internal wall, and wherein the lattice structure is in engagement with both the rear surface and the internal wall, and is formed integrally with the ball-striking face and the internal wall, wherein the lattice structure includes a first plurality of voids or slots formed in a first side thereof, and a second plurality of voids or slots formed in a second side thereof, and wherein the first plurality of voids or slots are angled relative to the rear surface and the second plurality of voids or slots are angled relative to the internal wall.

26. The golf club head of claim 25, wherein the lattice structure includes a plurality of beams extending between and in engagement with the rear surface and the internal wall.

27. The golf club head of claim 26, wherein the lattice structure varies in the thickness defined by the plurality of beams laterally along the insert.

28. The golf club head of claim 27, wherein the thickness of the plurality of beams increases adjacent to the toe side and the heel side, which provides an increased coefficient of restitution adjacent to the heel side and the toe side of the ball-striking face.

29. The golf club head of claim 25, wherein the body is formed layer by layer via an additive manufacturing process and the insert is formed integrally with the body.

* * * * *